US012658141B2

(12) United States Patent
Yoon et al.

(10) Patent No.: US 12,658,141 B2
(45) Date of Patent: Jun. 16, 2026

(54) DISPLAY DEVICE

(71) Applicant: Samsung Display Co., Ltd., Yongin-si (KR)

(72) Inventors: Jongchul Yoon, Yongin-si (KR); Semyung Kwon, Yongin-si (KR); Yeonggyu Kim, Yongin-si (KR); Sugwoo Jung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 116 days.

(21) Appl. No.: 18/513,695

(22) Filed: Nov. 20, 2023

(65) Prior Publication Data

US 2024/0290278 A1 Aug. 29, 2024

(30) Foreign Application Priority Data

Feb. 27, 2023 (KR) ........................ 10-2023-0026189

(51) Int. Cl.
*G09G 3/3266* (2016.01)
*G09G 3/32* (2016.01)

(52) U.S. Cl.
CPC ............. *G09G 3/3266* (2013.01); *G09G 3/32* (2013.01); *G09G 2310/0267* (2013.01); *G09G 2330/021* (2013.01)

(58) Field of Classification Search
CPC ................... G09G 3/32; G09G 3/3266; G09G 2310/0267; G09G 2330/021
See application file for complete search history.

(56) References Cited

U.S. PATENT DOCUMENTS

| | | | | |
|---|---|---|---|---|
| 8,866,141 | B2 | 10/2014 | Cho et al. | |
| 10,622,430 | B2 | 4/2020 | Jeong et al. | |
| 10,998,393 | B2 | 5/2021 | Jeong et al. | |
| 2018/0342572 | A1* | 11/2018 | Park | H10K 59/123 |
| 2023/0274687 | A1* | 8/2023 | In | G09G 3/2096 |
| 2023/0298529 | A1 | 9/2023 | In | |

FOREIGN PATENT DOCUMENTS

| | | |
|---|---|---|
| KR | 10-1375846 | 3/2014 |
| KR | 10-2018-0003367 | 1/2018 |
| KR | 10-2054682 | 12/2019 |
| KR | 10-2021-0051382 | 5/2021 |
| KR | 10-2023-0128209 | 9/2023 |
| KR | 10-2023-0129108 | 9/2023 |

* cited by examiner

*Primary Examiner* — Kenneth B Lee, Jr.
(74) *Attorney, Agent, or Firm* — Innovation Counsel LLP

(57) ABSTRACT

A display device includes a display area and a peripheral area, a transistor and a display element electrically connected to the thin-film transistor, the transistor and the display element being disposed in the display area, and a scan driver disposed in the peripheral area, wherein the scan driver includes a gate electrode having a plurality of prongs extending in a first direction and electrically connected to each other, and in a second direction intersecting the first direction, a first dummy gate electrode disposed on one side of the plurality of prongs and a second dummy gate electrode disposed on another side of the plurality of prongs.

20 Claims, 17 Drawing Sheets

DISPLAY DEVICE

CROSS-REFERENCE TO RELATED APPLICATION

This application claims priority to and benefits of Korean Patent Application No. 10-2023-0026189 under 35 U.S.C. § 119, filed on Feb. 27, 2023, in the Korean Intellectual Property Office (KIPO), the disclosure of which is incorporated by reference herein in its entirety.

BACKGROUND

1. Technical Field

One or more embodiments relate to a display device, and more specifically, to a display device capable of displaying high-quality images.

2. Description of the Related Art

In general, in a display device such as an organic light-emitting display device, thin-film transistors, connection electrodes, and wires are disposed in each (sub-) pixel to control the luminance of each (sub-) pixel disposed in a display area. A scan driver is disposed in a peripheral area outside the display area, and a scan signal from the scan driver is transferred to (sub-) pixels through scan lines.

However, in the conventional display device, a scan signal may not be accurately generated.

SUMMARY

One or more embodiments include a display device capable of displaying high-quality images. Embodiments set forth herein are examples, and the scope of the disclosure is not limited thereby.

Additional aspects will be set forth in part in the description which follows and, in part, will be apparent from the description, or may be learned by practice of the presented embodiments of the disclosure.

According to one or more embodiments, a display device includes a display area and a peripheral area, a transistor and a display element electrically connected to the transistor, the transistor and the display element being disposed in the display area, and a scan driver disposed in the peripheral area, wherein the scan driver includes a gate electrode having a plurality of prongs extending in a first direction and electrically connected to each other, and in a second direction intersecting the first direction, a first dummy gate electrode disposed on one side of the plurality of prongs and a second dummy gate electrode disposed on another side of the plurality of prongs.

The plurality of prongs may be integrally formed as a single body.

The display device may further include a first semiconductor layer overlapping the gate electrode, wherein lengths of portions of the plurality of prongs in the first direction may be substantially equal to each other, the portions of the plurality of prongs overlapping the first semiconductor layer.

A length of each of the first dummy gate electrode and the second dummy gate electrode in the first direction may be substantially equal to a length of a portion of each of the plurality of prongs in the first direction, the portion of each of the plurality of prongs overlapping the first semiconductor layer.

In a plan view, the first dummy gate electrode and the second dummy gate electrode may be disposed outside the first semiconductor layer.

The first semiconductor layer may include an oxide semiconductor.

The display device may further include a first semiconductor layer overlapping the gate electrode and having a plurality of through holes disposed between the plurality of prongs in a plan view, and a plurality of dummy semiconductor layers disposed within the plurality of through holes of the first semiconductor layer in a plan view.

The first semiconductor layer may include an oxide semiconductor, and the plurality of dummy semiconductor layers may include polysilicon.

The display device may further include a second semiconductor layer, the second semiconductor layer and the first semiconductor layer being disposed on different layers and including different materials, wherein the plurality of dummy semiconductor layers and the second semiconductor layer may include a same material.

The gate electrode, the first dummy gate electrode, and the second dummy gate electrode may be disposed on a same layer.

An interval between the plurality of prongs may be constant.

An interval between the first dummy gate electrode and a prong closest to the first dummy gate electrode from among the plurality of prongs may be substantially equal to an interval between the plurality of prongs.

An interval between the second dummy gate electrode and a prong closest to the second dummy gate electrode from among the plurality of prongs may be substantially equal to the interval between the plurality of prongs.

Widths of the plurality of prongs in the second direction may be substantially equal to each other.

A width of each of the first dummy gate electrode and the second dummy gate electrode in the second direction may be substantially equal to a width of each of the plurality of prongs in the second direction.

The scan driver may include a plurality of stages, wherein each of the plurality of stages may include an output terminal electrically connected to a corresponding scan line, and a transistor electrically connected to the output terminal, and having the gate electrode, the first dummy gate electrode, and the second dummy gate electrode.

The display device may further include first prongs disposed between the plurality of prongs in a plan view and electrically connected to each other; and second prongs disposed between the plurality of prongs in a plan view and electrically connected to each other, the second prongs being apart from the first prongs.

In a plan view, one of the first prongs may be disposed between the gate electrode and one of the first dummy gate electrode and the second dummy gate electrode, and one of the second prongs may be disposed between the gate electrode and another one of the first dummy gate electrode and the second dummy gate electrode.

The gate electrode, the first dummy gate electrode, and the second dummy gate electrode may have a same layered-structure.

Each of the gate electrode, the first dummy gate electrode, and the second dummy gate electrode may include a titanium layer.

Other aspects, features, and advantages than the above-described aspects, features, and advantages will be apparent from a detailed description, the claims, and the drawings.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION OF THE EMBODIMENTS

Figure 1:
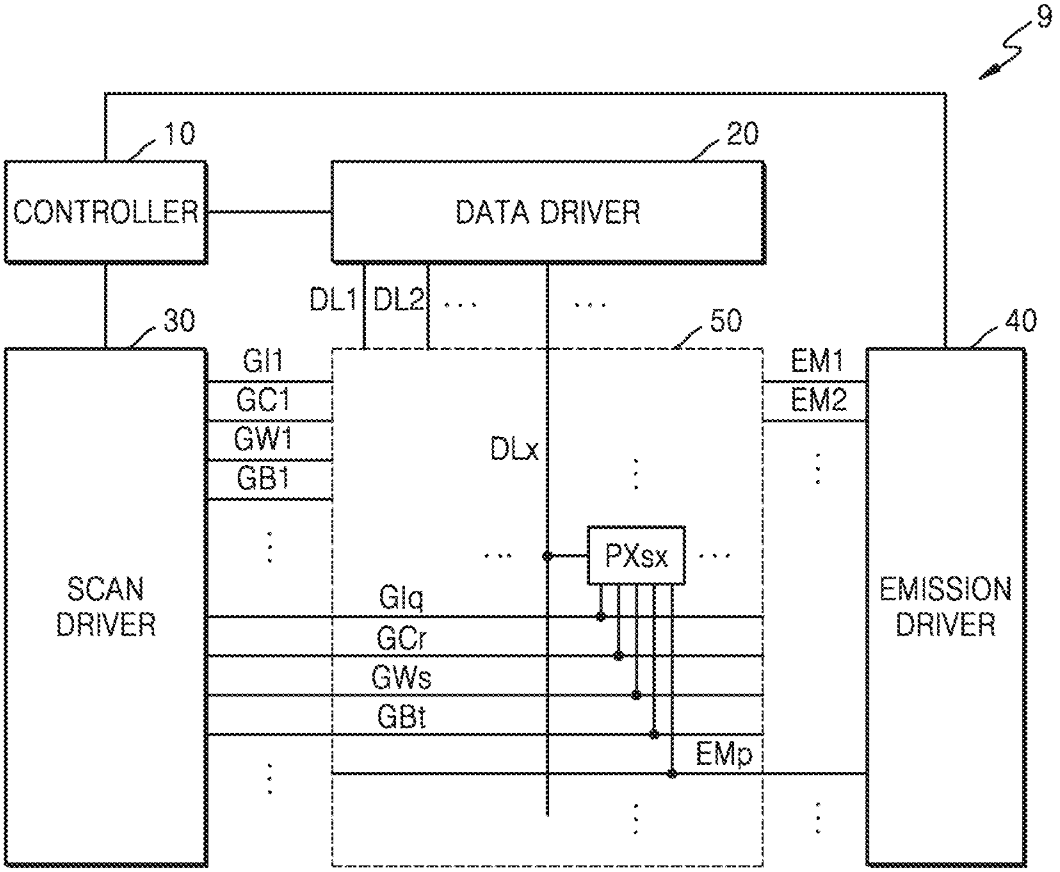
FIG. 1 is a conceptual diagram for explaining a display device according to an embodiment.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects of the description.

The term "and/or" includes all combinations of one or more of which associated configurations may define. For example, "A and/or B" may be understood to mean "A, B, or A and B."

For the purposes of this disclosure, the phrase "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z.

Various modifications may be applied to the embodiments, and particular embodiments will be illustrated in the drawings and described in the detailed description section. The effect and features of the embodiments, and a method to achieve the same, will be clearer referring to the detailed descriptions below with the drawings. However, the embodiments may be implemented in various forms, not by being limited to the embodiments presented below.

Hereinafter, embodiments will be described in detail with reference to the accompanying drawings, and in the description with reference to the drawings, the same or corresponding constituents are indicated by the same reference numerals and redundant descriptions thereof are omitted.

It will be understood that when a component, such as a layer, a film, a region, or a plate, is referred to as being "on" another component, the component may be directly on the other component or intervening components may be present therebetween. Sizes of components in the drawings may be exaggerated for convenience of explanation. For example, since sizes and thicknesses of components in the drawings are arbitrarily illustrated for convenience of explanation, the following embodiments are not limited thereto.

The x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

In the following embodiment, it will be understood that although the terms "first," "second," etc. may be used herein to describe various components, these components should not be limited by these terms. These terms are only used to distinguish one component from another.

In the following embodiment, it will be further understood that the terms "include", "comprise", and/or "have" used herein specify the presence of stated features or components, but do not preclude the presence or addition of one or more other features or components.

In the following embodiments, when layers, regions, or components are connected to each other, the layers, the regions, or the components may be directly connected to each other, or another layer, another region, or another component may be interposed between the layers, the regions, or the components and thus the layers, the regions, or the components may be indirectly connected to each other. For example, in the following embodiments, when layers, regions, or components are electrically connected to each other, the layers, the regions, or the components may be directly electrically connected to each other, or another layer, another region, or another component may be interposed between the layers, the regions, or the components and thus the layers, the regions, or the components may be indirectly electrically connected to each other.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

FIG. 1 is a conceptual diagram for explaining a display device 9 according to an embodiment.

As shown in FIG. 1, the display device 9 according to an embodiment may include a controller 10, a data driver 20, a scan driver 30, an emission driver 40, and/or a display area 50. For example, at least one of the controller 10, data driver 20, scan driver 30, and emission driver 40 may be disposed in the display area 50 and/or in a non-display area.

The controller 10 may receive an external input signal from an external processor. The external input signal may include a horizontal synchronization signal, a vertical synchronization signal, a data enable signal, an RGB data signal, or the like.

The vertical synchronization signal may include pulses. It may be considered that a previous frame period ends and the current frame period starts based on a time point at which pulses of the vertical synchronization signal are generated. Accordingly, an interval between adjacent pulses of the vertical synchronization signal may correspond to a frame period. The horizontal synchronization signal may also include pulses. It may be considered that a previous horizontal period ends and a new horizontal period starts based on a time point at which pulses of the horizontal synchronization signal are generated. Accordingly, an interval between adjacent pulses of the horizontal synchronization signal may correspond to a horizontal period.

The data enable signal may be maintained at an enable level during certain horizontal periods and maintained at a disable level during the remaining periods. During horizontal periods in which the data enable signal is at an enable level, the RGB data signal may be supplied. The RGB data signal may be supplied in units of rows of pixels in the display area 50 during the horizontal periods. For reference, pixels connected to a same scan line may be referred to as pixels disposed in a same row. The controller 10 may generate grayscale values based on the RGB data signal to correspond to the specifications of the display device 9. The controller 10 may generate control signals to be supplied to the data driver 20, the scan driver 30, the emission driver 40, etc. based on an external input signal to correspond to the specifications of the display device 9.

The data driver 20 may generate data signals to be provided to data lines DL1, DL2, . . . , DLx, . . . by using the grayscale values and control signals received from the controller 10. For example, the data driver 20 may sample grayscale values by using a clock signal and may supply data signals corresponding to the grayscale values to the data lines DL1, DL2, . . . , DLx, . . . in units of rows of pixels in the display area 50. Here, x may be a natural number.

The scan driver 30 may receive a clock signal and a scan start signal from the controller 10 and generate scan signals to be provided to scan lines GI1, GC1, GW1, GB1, . . . , GIq, GCr, GWs, GBt, . . . . Here, q, r, s, and t may be natural numbers.

The scan driver 30 may include sub-scan drivers. For example, a first sub-scan driver may generate scan signals to be provided to first scan lines GI1, . . . , GIq, . . . . A second sub-scan driver may generate scan signals to be provided to second scan lines GC1, . . . , GCr, . . . . A third sub-scan driver may generate scan signals to be provided to third scan lines GW1, . . . , GWs, . . . . A fourth sub-scan driver may generate scan signals to be provided to fourth scan lines GB1, . . . , GBt, . . . . Each of the sub-scan drivers may include stages connected in the form of a shift register. For example, scan signals may be generated by sequentially transferring turn-on level pulses of a scan start signal supplied to a scan start line to the next scan stage. In some embodiments, some sub-scan drivers may be integrated.

The emission driver 40 may receive a clock signal and an emission stop signal from the controller 10 and generate emission signals to be provided to emission lines EM1, EM2, . . . , EMp, . . . . Here, p may be a natural number. For example, the emission driver 40 may sequentially provide emission signals having turn-off level pulses to the emission lines EM1, EM2, . . . , EMp, . . . . For example, the emission driver 40 may be configured in the form of a shift register, and may generate emission signals by sequentially transferring the turn-off level pulse of the emission stop signal to the next emission stage under the control of a clock signal.

A substrate may have the display area 50 and a peripheral area outside the display area 50, and components may be disposed in the peripheral area outside the display area 50.

The display area 50 may include pixels. A pixel PXsx may include a pixel circuit including a thin-film transistor and a display element electrically connected to the pixel circuit. The pixel PXsx may be electrically connected to a corresponding data line DLx, corresponding scan lines GIq, GCr, GWs, and GBt, and a corresponding emission line EMp.

Figure 2:
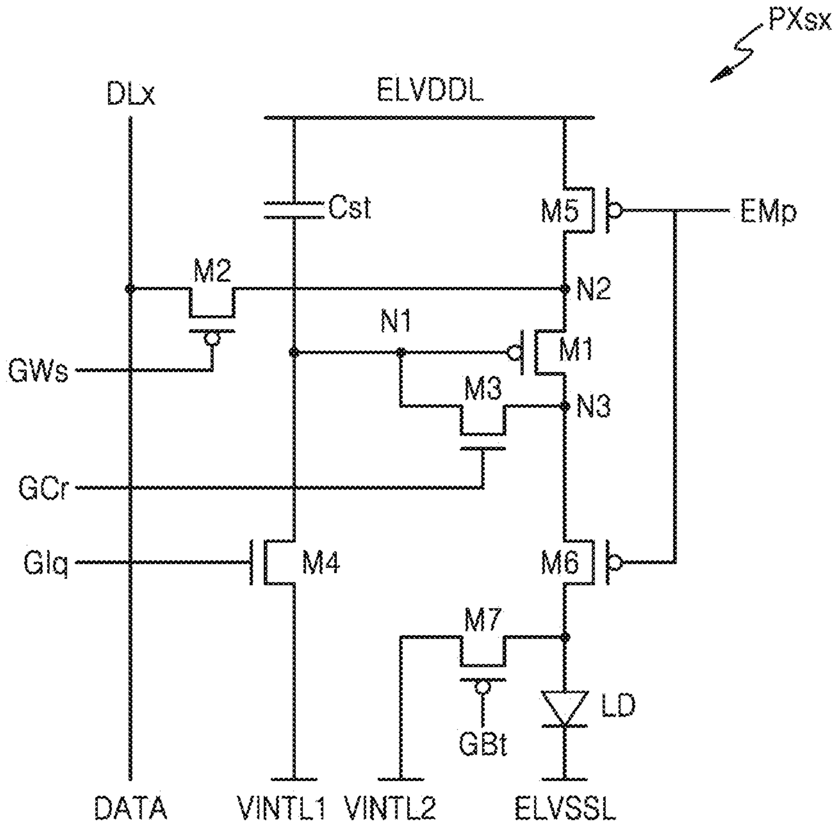
FIG. 2 is a schematic diagram of an equivalent circuit illustrating a display element and a pixel circuit connected to a display element, included in the display device of FIG. 1.

FIG. 2 is a schematic diagram of an equivalent circuit illustrating a display element and a pixel circuit connected to the display element, included in the display device of FIG. 1. For example, as shown in FIG. 2, the display device according to the embodiment may include a light-emitting element LD as a display element, and a pixel circuit connected to the light-emitting element LD may include transistors M1, M2, M3, M4, M5, M6, and M7 and a capacitor Cst. The pixel PXsx shown in FIG. 1 may include the pixel circuit and the light-emitting element LD.

A gate electrode of the transistor M1 may be connected to a node N1, a first electrode of the transistor M1 may be connected to a node N2, and a second electrode of the transistor M1 may be connected to a node N3. The first electrode may be one of a source electrode and a drain electrode, and the second electrode may be the other one. The transistor M1 may control the amount of current flowing through the light-emitting element LD, and the transistor M1 may be a driving transistor.

A gate electrode of the transistor M2 may be connected to a third scan line GWs to receive one of third scan signals, a first electrode of the transistor M2 may be connected to a data line DLx, and a second electrode of the transistor M2 may be connected to the node N2. The transistor M2 may be a scan transistor because the transistor M2 receives a data signal DATA from the data line DLx in case that the transistor M2 is turned on.

A gate electrode of the transistor M3 may be connected to a second scan line GCr to receive one of second scan signals, a first electrode of the transistor M3 may be connected to the node N1, and a second electrode of the transistor M3 may be connected to the node N3. The transistor M3 may serve to compensate for a threshold voltage by diode-connecting the transistor M1 that is the driving transistor, and the transistor M3 may be a compensation transistor.

A gate electrode of the transistor M4 may be connected to a first scan line GIq to receive one of first scan signals, a first electrode of the transistor M4 may be connected to the node N1, and a second electrode of the transistor M4 may be connected to a first initialization line VINTL1. The transistor M4 may serve to initialize the potential of the node N1 to which the gate electrode of the transistor M1 that is the driving transistor is connected, and the transistor M4 may be a gate initialization transistor.

A gate electrode of the transistor M5 may be connected to an emission line EMp to receive one of emission signals, a first electrode of the transistor M5 may be connected to a first power line ELVDDL, and a second electrode of the transistor M5 may be connected to the node N2. In case that the transistor M5 is turned on, a first power may be supplied to the transistor M1 serving as a driving transistor, and the light-emitting element LD may emit light. Thus, the transistor M5 may be a first light-emitting transistor.

A gate electrode of the transistor M6 may also be connected to the emission line EMp to receive one of the emission signals. A first electrode of the transistor M6 may be connected to the node N3, and a second electrode of the transistor M6 may be electrically connected to the light-emitting element LD. In case that the transistor M6 is turned on, a current controlled by the transistor M1 that is the driving transistor may flow to the light-emitting element LD, and the light-emitting element LD may emit light. Thus, the transistor M6 may be a second light-emitting transistor.

A gate electrode of the transistor M7 may be connected to a fourth scan line GBt to receive one of fourth scan signals, a first electrode of the transistor M7 may be connected to a second initialization line VINTL2, and a second electrode of the transistor M7 may be electrically connected to the light-emitting element LD. The potential of the anode of the light-emitting element LD may be initialized when the transistor M7 is turned on, and the transistor M7 may be an anode initialization transistor. In some embodiments, the gate electrode of the transistor M7 may be connected to the third scan line GWs.

The capacitor Cst may have a first electrode and a second electrode, the first electrode may be connected to the first power line ELVDDL, and the second electrode may be connected to the node N1.

In the light-emitting element LD, a first electrode (e.g., anode) may be connected to the second electrode of the transistor M6 and the second electrode of the transistor M7, and a second electrode (e.g., cathode) may be connected to a second power line ELVSSL. During an emission period of the light-emitting element LD, a voltage applied to the second power line ELVSSL may be set to be lower than a voltage applied to the first power line ELVDDL. The light-emitting element LD may be an organic light-emitting diode or an inorganic light-emitting diode. FIG. 2 may illustrate that the pixel PXsx includes one light-emitting element LD, but this is just an example. If necessary, the pixel PXsx may include multiple light-emitting elements connected in series, in parallel, or in series and parallel.

The transistors M1, M2, M5, M6, and M7 may be P-type transistors and may include a semiconductor layer including polysilicon. Polysilicon has high electron mobility, and thus, a transistor including the polysilicon may have fast driving characteristics.

The transistors M3 and M4 may be N-type transistors and may include a semiconductor layer including an oxide semiconductor. The oxide semiconductor may have lower charge mobility than polysilicon. Accordingly, the amount of leakage current generated in a turn-off state of a transistor including the oxide semiconductor may be less than that of a transistor including polysilicon.

Figure 3:
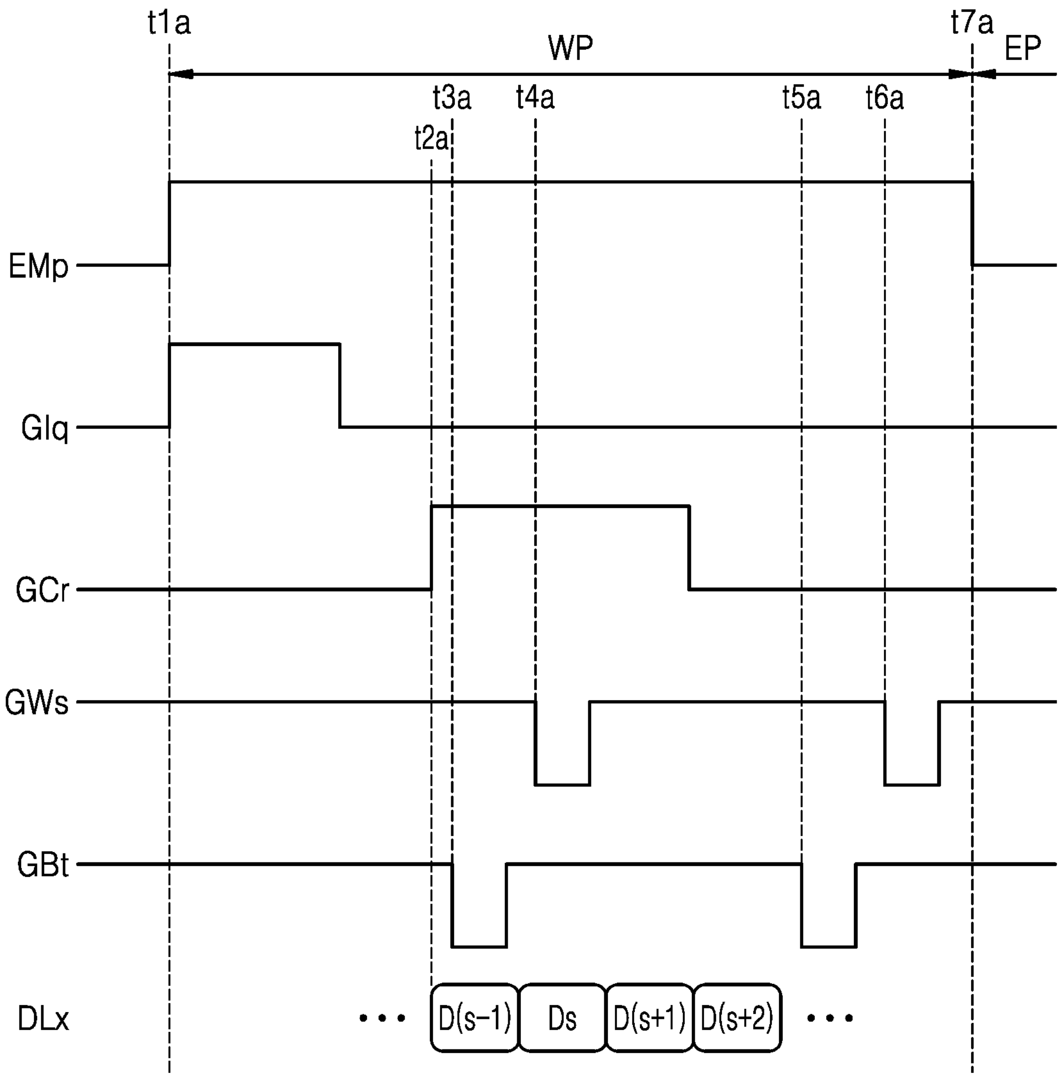
FIG. 3 is a waveform diagram for explaining a data writing period of a display device according to an embodiment.

FIG. 3 is a schematic waveform diagram for explaining a data writing period of a display device according to an embodiment.

At a time point t1*a*, an emission signal having a turn-off level (e.g., high level) may be applied to the emission line EMp. Accordingly, the transistors M5 and M6 may be turned off, and thus, the light-emitting element LD may be in a non-emission state. Also, at the time point t1*a*, a first scan signal having a turn-on level (e.g., high level) may be applied to the first scan line GIq. Accordingly, the transistor M4 may be turned on, the node N1 and the first initialization line VINTL1 may be electrically connected to each other, and thus, the node N1 may be initialized with a first initialization voltage of the first initialization line VINTL1. The first initialization voltage may be a voltage sufficiently lower than the voltage of the node N2. Thus, the transistor M1 may be ON-biased, and a hysteresis phenomenon dependent on a gray level of a previous frame period may be prevented.

At a time point t2*a*, a second scan signal having a turn-on level (e.g., high level) may be applied to the second scan line GCr. Accordingly, the transistor M3 may be turned on, and the transistor M1 may be diode-connected, and thus a threshold voltage may be compensated.

At a time point t3*a*, a fourth scan signal having a turn-on level (e.g., low level) may be applied to the fourth scan line GBt. Accordingly, the transistor M7 may be turned on, and thus, a second initialization line VINTL2 and the first electrode of the light-emitting element LD may be connected to each other. For example, a second initialization voltage of the second initialization line VINTL2 may be a sufficiently low voltage, and accordingly, the light-emitting element LD may easily express black gradations or low gradations. The second initialization voltage may be equal to or lower than the voltage of the second power line ELVSSL.

At a time point t4*a*, a third scan signal having a turn-on level (e.g., low level) may be applied to the third scan line GWs. Accordingly, the transistor M2 may be turned on, and the data line DLx and the node N2 may be electrically connected to each other. Data voltages D (s−1), Ds, D (s+1), and D (s+2) corresponding to each pixel row may be sequentially applied to the data line DLx. At the time point t4*a*, a data voltage Ds corresponding to the pixel PXsx may be applied to the data line DLx. The magnitude of the data voltage Ds may correspond to the gray level of the pixel PXsx. The data voltage Ds may be applied to the gate electrode of the transistor M1 by sequentially passing through the transistors M2, M1, and M3. The voltage applied to the gate electrode of the transistor M1 may be a compensated data voltage Ds including a decrease corresponding to the threshold voltage of the transistor M1. The compensated data voltage Ds may be maintained by the capacitor Cst.

At a time point t5*a*, a fourth scan signal having a turn-on level (e.g., low level) may be applied to the fourth scan line GBt. Also, at a time point t6*a*, a third scan signal having a turn-on level (e.g., low level) may be applied to the third scan line GWs.

The display device may be driven by a low-frequency driving method. Each of the frame periods may sequentially include a data writing period WP, an emission period EP, a bias refresh period and an emission period EP. During the bias refresh period, the transistors M3 and M4 may remain turned off, and the capacitor Cst may maintain a same data voltage for a frame period. During the bias refresh period, a fourth scan signal having a turn-on level (e.g., low level) may be applied to the fourth scan line GBt, and a third scan signal having a turn-on level (e.g., low level) may be applied to the third scan line GWs, and thus, a fourth scan signal application time point (e.g., time point t5*a*) and a third scan signal application time point (e.g., time point t6*a*), shown in FIG. 3, may correspond to a fourth scan signal application time point and a third scan signal application time point during a bias refresh period.

In this way, by aligning the fourth scan signal application time point (e.g., time point t5*a*) and the third scan signal application time point (e.g., time point t6*a*) during high-frequency driving with the fourth scan signal application time point (e.g., time point t5*a*) and the third scan signal application time point (e.g., time point t6*a*) during the bias refresh period during low-frequency driving, an emission waveform of the light-emitting element LD during high-frequency driving may be similar to an emission waveform of the light-emitting element LD during low-frequency driving.

At a time point t7*a*, an emission signal having a turn-on level (e.g., low level) may be applied to the emission line EMp. Accordingly, the transistors M5 and M6 may be turned on, and thus, the light-emitting element LD may be in an emission state.

Figure 4:
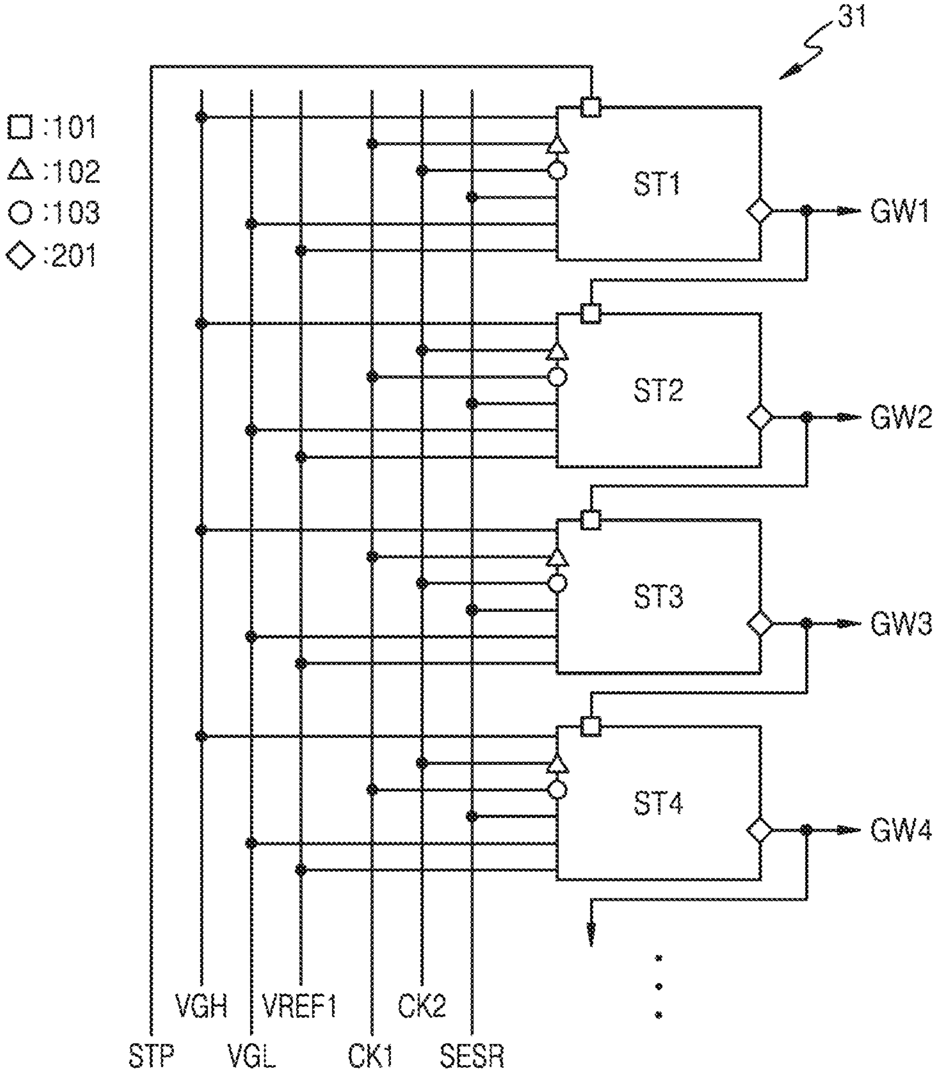
FIG. 4 is a block diagram for explaining a scan driver included in a display device according to an embodiment.

FIG. 4 is a schematic block diagram for explaining a scan driver 31 included in a display device according to an embodiment.

Hereinafter, for convenience, a case in which the scan driver 31 is a third sub-scan driver supplying third scan signals to third scan lines GW1, GW2, GW3, GW4, . . . will be described. For reference, as can be seen from the waveform diagram of FIG. 3, a negative pulse may also be applied to the fourth scan line GBt. Therefore, in case that only the period and timing of the clock signals are set differently, the scan driver 31 and a fourth sub-scan driver connected to the fourth scan line GBt may also have a same configuration.

As shown in FIG. 4, the scan driver 31 may include stages ST1, ST2, ST3, ST4, . . . .

Each of the stages ST1, ST2, ST3, ST4, . . . may include a first input terminal 101, a second input terminal 102, a third input terminal 103, common input terminals, and an output terminal 201. Each of the stages ST1, ST2, ST3, ST4, . . . may receive a voltage of a high level VGH, a voltage of a low level VGL, a first reference voltage VREF1, and an initialization signal SESR through the common input terminals.

A first input terminal 101 of the first stage ST1 may receive a scan start signal STP. First input terminals 101 of the stages ST2, ST3, ST4, . . . after the first stage ST1 may be respectively connected to output terminals 201 of previous stages. For example, the first input terminals 101 of the stages ST2, ST3, ST4, . . . after the first stage ST1 may respectively receive third scan signals output from the previous stages as carry signals.

A second input terminal 102 and a third input terminal 103 of each of the stages ST1, ST2, ST3, ST4, . . . may receive different clock signals CK1 and CK2. For example, the second input terminals 102 of the stages ST1, ST2, ST3, ST4, . . . may alternately receive a first clock signal CK1 and a second clock signal CK2. For example, the second input terminals 102 of odd-numbered stages, e.g., the stages ST1 and ST3, may receive the first clock signal CK1. The second input terminals 102 of even-numbered stages, e.g., the stages ST2 and ST4, may receive the second clock signal CK2.

The third input terminals 103 of the stages ST1, ST2, ST3, ST4, . . . may alternately receive the second clock signal CK2 and the first clock signal CK1. For example, the third input terminals 103 of the odd-numbered stages, e.g., the stages ST1 and ST3, may receive the second clock signal CK2. The third input terminals 103 of the even-numbered stages, e.g., the stages ST2 and ST4, may receive the first clock signal CK1.

Figure 5:
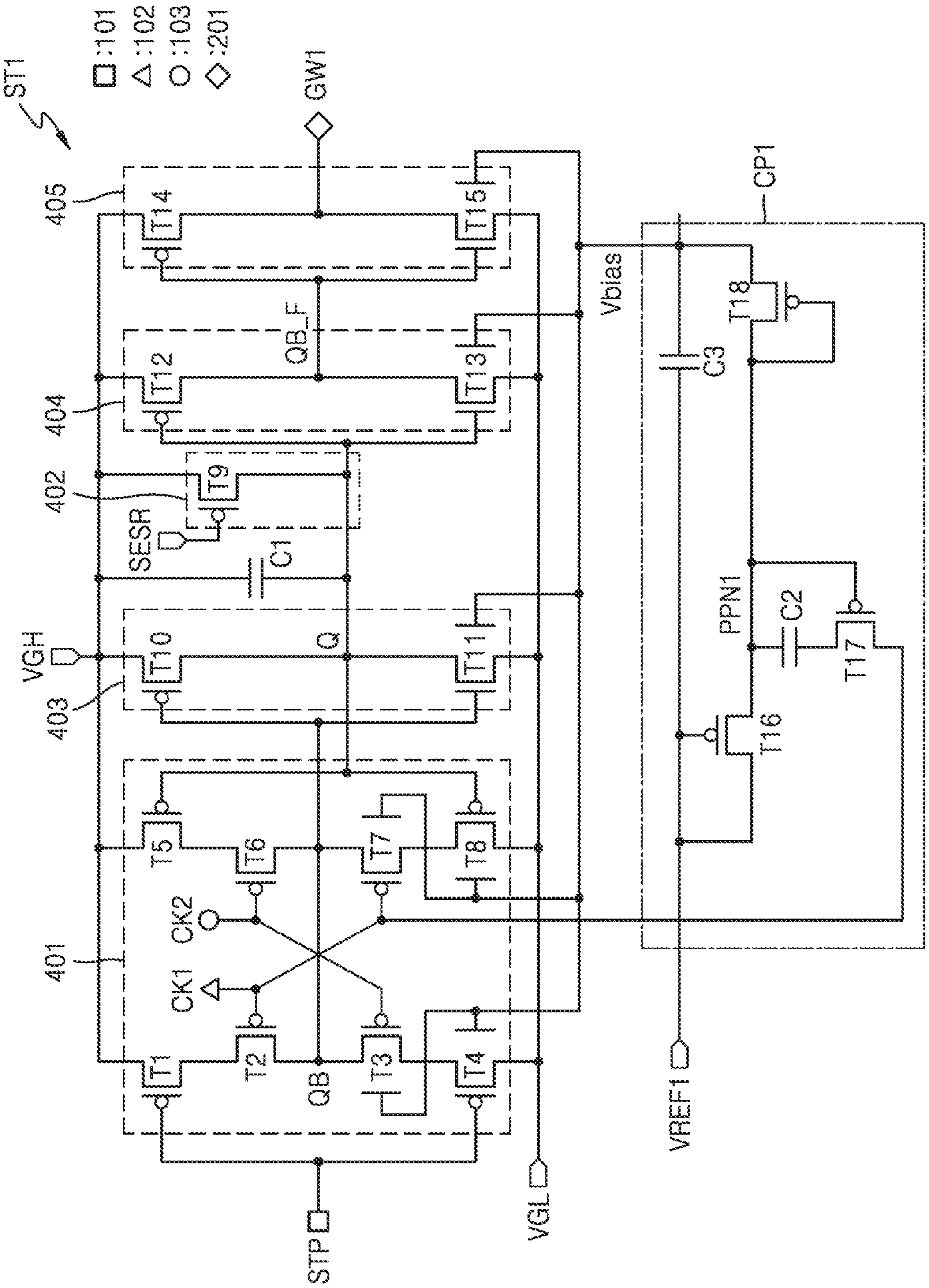
FIG. 5 is a schematic diagram of an equivalent circuit for explaining a stage included in the scan driver of FIG. 4.

FIG. 5 is a schematic diagram of an equivalent circuit for explaining a stage included in the scan driver 31 of FIG. 4. As shown in FIG. 5, a first stage ST1 may be implemented as complementary metal-oxide semiconductor (CMOS). The first stage ST1 may include a first node setting portion 401, an initialization portion 402, a second node setting portion 403, a third node setting portion 404, an output portion 405, and a first charge pump CP1. The first stage ST1 and the other stages ST2, ST3, ST4, . . . may have a same configuration except that the first input terminal 101 receives a carry signal, and thus, descriptions of the same parts are omitted.

The first node setting portion 401 may charge a first node QB to a high level voltage in case that the scan start signal STP is at a low level and the first clock signal CK1 is at a low level. The first node setting portion 401 may include first to eighth transistors T1 to T8. The first node setting portion 401 may include at least one N-type transistor. FIG. 5 illustrates that the third transistor T3, the fourth transistor T4, the seventh transistor T7, and the eighth transistor T8 are N-type transistors. However, the embodiments are not limited thereto, and different types of transistors may be used for the transistors discussed herein.

The first transistor T1, which is a P-type transistor, may have a first electrode receiving a voltage of a high level VGH, and a gate electrode receiving a scan start signal STP. The second transistor T2, which is a P-type transistor, may have a first electrode connected to a second electrode of the first transistor T1, a second electrode connected to a first node QB, and a gate electrode receiving the first clock signal CK1. The third transistor T3, which is an N-type transistor, may have a first electrode connected to the first node QB and a gate electrode receiving the second clock signal CK2. The fourth transistor T4, which is an N-type transistor, may have a first electrode connected to a second electrode of the third transistor T3, a second electrode receiving a voltage of a low level VGL, and a gate electrode receiving the scan start signal STP.

The fifth transistor T5, which is a P-type transistor, may have a first electrode receiving the voltage of the high level VGH, and a gate electrode connected to a second node Q. The sixth transistor T6, which is a P-type transistor, may have a first electrode connected to a second electrode of the fifth transistor T5, a second electrode connected to the first node QB, and a gate electrode receiving the second clock signal CK2. The seventh transistor T7, which is an N-type transistor, may have a first electrode connected to the first node QB, and a gate electrode receiving the first clock signal CK1. The eighth transistor T8, which is an N-type transistor, may have a first electrode connected to the second electrode of the seventh transistor T7, a second electrode receiving the voltage of the low level VGL, and a gate electrode connected to the second node Q.

The initialization portion 402 may include a ninth transistor T9. The ninth transistor T9, which is a P-type transistor, may have a first electrode receiving the voltage of the high level VGH, a second electrode connected to the second node Q, and a gate electrode receiving the initialization signal SESR. The initialization portion 402 may initialize one of the first node QB, the second node Q, and a third node QB_F according to the logic level of the initialization signal SESR. FIG. 5 illustrates that the initialization portion 402 initializes the second node Q in case that the initialization signal SESR is at a low level. The initialized second node Q may be charged to a high level.

The second node setting portion 403 may charge the voltage of the second node Q to a high level voltage in case that the voltage of the first node QB is at a low level, and may discharge the voltage of the second node Q to a low level in case that the voltage of the first node QB is at a high level. The second node setting portion 403 may include a tenth transistor T10 and an eleventh transistor T11. The second node setting portion 403 may include at least one N-type transistor.

The tenth transistor T10, which is a P-type transistor, may have a first electrode receiving the voltage of the high level VGH, a second electrode connected to the second node Q, and a gate electrode connected to the first node QB. The eleventh transistor T11, which is an N-type transistor, may have a first electrode connected to the second node Q, a second electrode receiving the voltage of the low level VGL, and a gate electrode connected to the first node QB.

The third node setting portion 404 may charge the third node QB_F with a high level voltage in case that the voltage of the second node Q is at a low level, and may discharge the third node QB_F with a low level voltage in case that the voltage of the second node Q is at a high level. The third node setting portion 404 may include a twelfth transistor T12 and a thirteenth transistor T13. The third node setting portion 404 may include at least one N-type transistor.

The twelfth transistor T12, which is a P-type transistor, may have a first electrode receiving the voltage of the high level VGH, a second electrode connected to the third node QB_F, and a gate electrode connected to the second node Q. The thirteenth transistor T13, which is an N-type transistor, may have a first electrode connected to the third node QB_F, a second electrode receiving the voltage of the low level VGL, and a gate electrode connected to the second node Q.

The output portion 405 may output a scan signal of the high level VGH to the output terminal 201 in case that the voltage of the third node QB_F is at a low level, and may output a scan signal of the low level VGL to the output terminal 201 in case that the voltage of the third node QB_F is at a high level. The output portion 405 may include a fourteenth transistor T14 and a fifteenth transistor T15. The output portion 405 may include at least one N-type transistor.

The fourteenth transistor T14, which is a P-type transistor, may have a first electrode receiving the voltage of the high level VGH, a second electrode connected to the output terminal 201, and a gate electrode connected to the third node QB_F. The fifteenth transistor T15, which is an N-type transistor, may have a first electrode connected to the output terminal 201, a second electrode receiving the voltage of the low level VGL, and a gate electrode connected to the third node QB_F.

The first stage ST1 may include a first capacitor C1 having a first electrode receiving the voltage of the high level VGH and a second electrode connected to the second node Q. The purpose of the first capacitor C1 may be to maintain the voltage of the second node Q, and the first electrode of the first capacitor C1 may be configured to receive the voltage of the low level VGL. In case that the parasitic capacitance of the second node Q is sufficient according to layout, the first capacitor C1 may be omitted.

The first charge pump CP1 may supply a bias voltage Vbias to a back gate electrode of at least one N-type transistor included in each of the first node setting portion 401, the second node setting portion 403, the third node setting portion 404, and the output portion 405. Accordingly, the first charge pump CP1 may supply the bias voltage Vbias to back gate electrodes of the third transistor T3, the fourth transistor T4, the seventh transistor T7, the eighth transistor T8, the eleventh transistor T11, the thirteenth transistor T13, and the fifteenth transistor T15.

A semiconductor layer included in the transistors T3, T4, T7, T8, T11, T13, and T15 may include an oxide semiconductor. Depending on the type, the oxide semiconductor may have a negative threshold voltage. Accordingly, by applying a bias voltage Vbias less than the voltage of the low level VGL to the back gate electrodes of the transistors T3, T4, T7, T8, T11, T13, and T15, the transistors T3, T4, T7, T8, T11, T13, and T15 may be set to have positive threshold voltages.

The first charge pump CP1 may include a sixteenth to eighteenth transistors T16 to T18, a second capacitor C2, and a third capacitor C3. The sixteenth to eighteenth transistors T16 to T18 may be P-type transistors.

A gate electrode and a first electrode of the sixteenth transistor T16 may receive the first reference voltage VREF1, and a second electrode of the sixteenth transistor T16 may be connected to a fourth node PPN1. A first electrode of the second capacitor C2 may be connected to the fourth node PPN1. The seventeenth transistor T17 may have a first electrode connected to a second electrode of the second capacitor C2, a second electrode receiving the first clock signal CK1, and a gate electrode connected to the fourth node PPN1. In some embodiments, the second electrode of the seventeenth transistor T17 may receive the second clock signal CK2. The eighteenth transistor T18 may have a first electrode and a gate electrode connected to the fourth node PPN1, and a second electrode supplying the bias voltage Vbias. A first electrode of the third capacitor C3 may receive the first reference voltage VREF1, and a second electrode of the third capacitor C3 may be connected to the second electrode of the eighteenth transistor T18. The purpose of the third capacitor C3 may be to maintain the voltage of the bias voltage Vbias, and the first electrode of the third capacitor C3 may be configured to receive the voltage of the low level VGL. In some embodiments, in case that the parasitic capacitance for the bias voltage Vbias is sufficient, the third capacitor C3 may be omitted.

Figure 6:
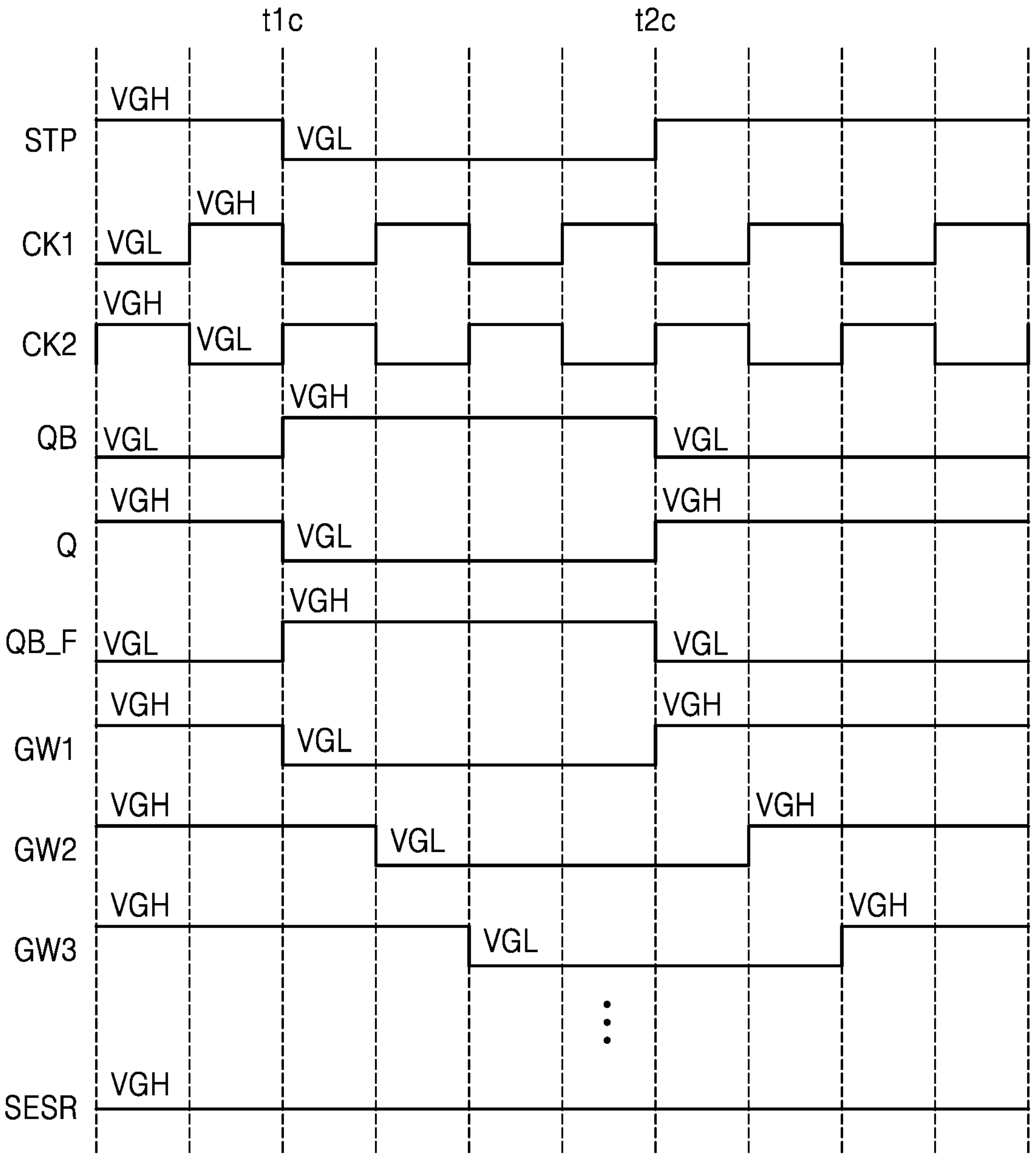
FIG. 6 is a waveform diagram for explaining an operation of the stage of FIG. 5.

FIG. 6 is a schematic waveform diagram for explaining an operation of the stage of FIG. 5.

Although not shown in the drawings, the initialization signal SESR may be set to the low level VGL before a time point t1*c*, and the second node Q of each of the stages ST1, ST2, ST3, ST4, . . . may be initialized to a high level. Thereafter, before the time point t1*c*, the initialization signal SESR may be set to the high level VGH, as shown in FIG. 6.

The phase of the first clock signal CK1 and the phase of the second clock signal CK2 may be different from each other by 180 degrees. For example, in case that the first clock signal CK1 is at the high level VGH, the second clock signal CK2 may be at the low level VGL, and in case that the first clock signal CK1 is at the low level VGL, the second clock signal CK2 may be at the high level VGH.

At a time point t1*c*, the scan start signal STP having the low level VGL may be supplied. At this time, the first clock signal CK1 may be at a low level VGL. Accordingly, the first transistor T1 and the second transistor T2 may be turned on, and the voltage of the first node QB may be charged to the high level VGH.

The voltage of the first node QB may be at the high level VGH, and the eleventh transistor T11 may be turned on. Accordingly, the voltage of the second node Q may be discharged to the low level VGL. Accordingly, the twelfth transistor T12 may be turned on, and the voltage of the third node QB_F may be charged to the high level VGH. Accordingly, the fifteenth transistor T15 may be turned on, and the voltage of the low level VGL may be applied to the output terminal 201. Accordingly, the third scan signal having the low level VGL may be output to a third scan line GW1.

At a time point t2*c*, as the scan start signal STP having the high level VGH is supplied, the voltages of the first node QB and the third node QB_F may be discharged to the low level VGL, and the voltage of the second node Q may be charged to the high level VGH. Accordingly, the third scan signal having the high level VGH may be output to the third scan line GW1.

In the second stage ST2, in case that the third scan signal of the third scan line GW1 and the second clock signal CK2 are at the low level VGL, the third scan signal having the low level VGL may be output to the third scan line GW2. In the third stage ST3, in case that the third scan signal of the third scan line GW2 and the first clock signal CK1 are at the low level VGL, the third scan signal having the low level VGL may be output to the third scan line GW3. Accordingly, the scan driver 31 may sequentially output the third scan signals having the low level VGL.

Figure 7:
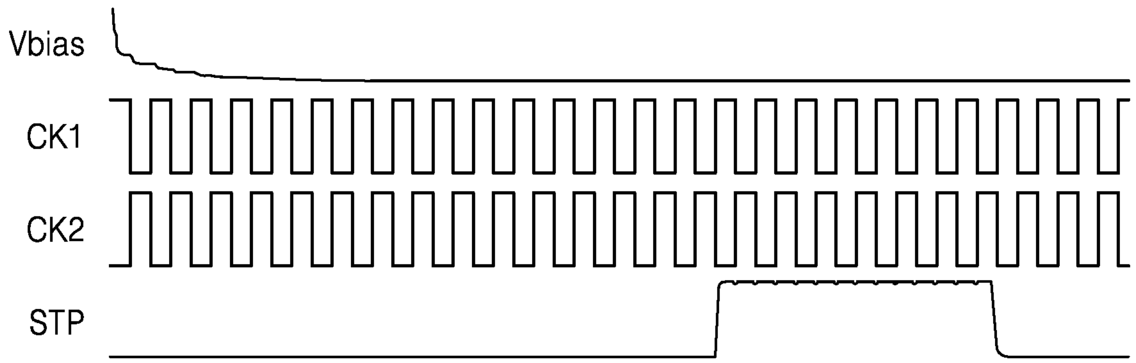
FIG. 7 is a waveform diagram for explaining a first bias voltage.

FIG. 7 is a schematic waveform diagram for explaining a first bias voltage. As shown in FIG. 7, the bias voltage Vbias may be settled before the scan start signal STP having the high level is generated. The sixteenth transistor T16 may be diode-connected, and the initial voltage of the fourth node PPN1 may correspond to a value obtained by subtracting the threshold voltage of the sixteenth transistor T16 from the first reference voltage VREF1. The first reference voltage VREF1 may be set to be higher than the low level VGL and lower than the high level VGH. In case that the first clock signal CK1 changes from the high level VGH to the low level VGL, the voltage of the fourth node PPN1 may become lower by a voltage difference VGH-VGL. In this case, charges on the back gate electrodes of the transistors T3, T4, T7, T8, T11, T13, and T15 may be released through the turned-on eighteenth transistor T18. By repeating this process (e.g., charge pumping), the settled bias voltage Vbias may become lower than the voltage of the low level VGL. Accordingly, a low voltage source lower than the voltage of the low level VGL may be unnecessary, and power consumption may be reduced.

Figure 8:
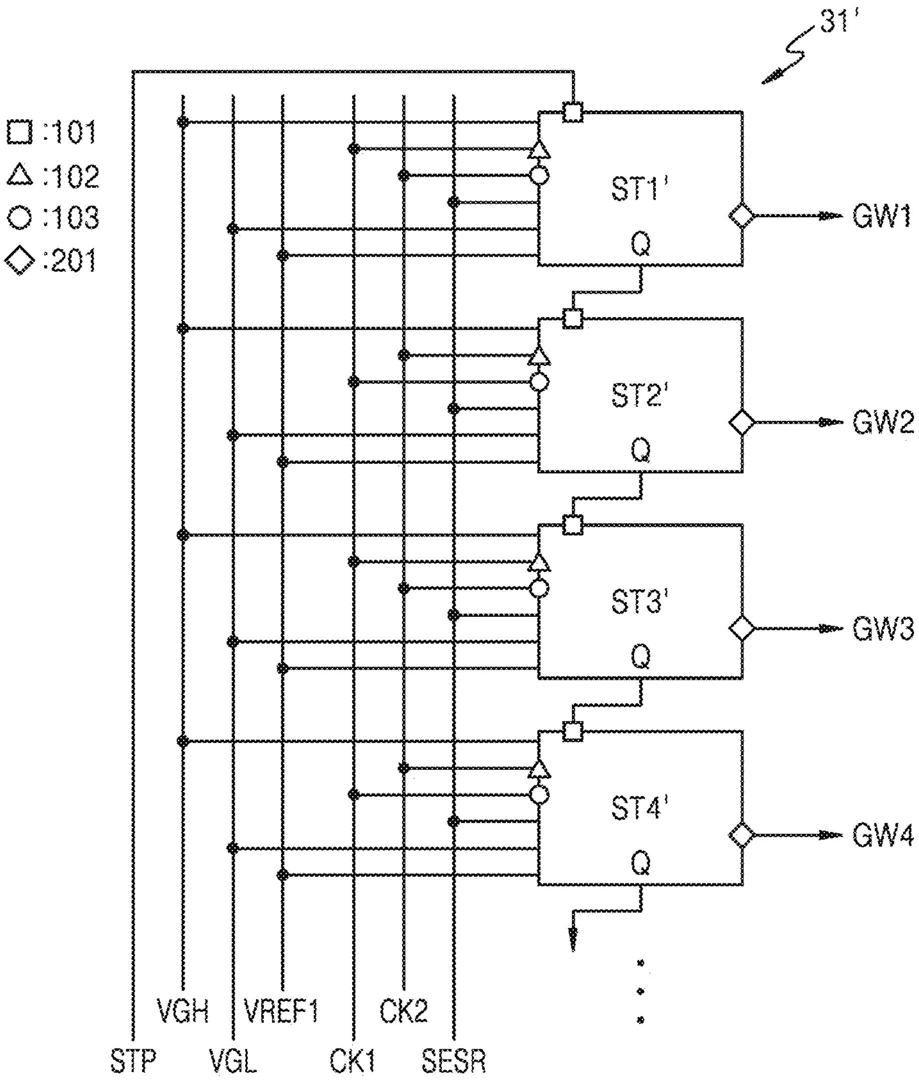
FIG. 8 is a block diagram for explaining a scan driver included in a display device according to an embodiment.

FIG. 8 is a schematic block diagram for explaining a scan driver 31' included in a display device according to an embodiment. Unlike in the scan driver 31 of FIG. 4, in the scan driver 31' of FIG. 8, a first input terminal 101 of each of the other stages ST2', ST3', ST4', . . . except for a first stage ST1' may be connected to a second node Q of the previous stage.

Referring to FIG. 8, the voltage level of the second node Q and the voltage level of the third scan signal may be synchronized, and the scan driver 31' of FIG. 8 and the scan driver 31 of FIG. 4 may operate in a same way. The circuit structures of the stages ST1' to ST4' may be the same as those shown in FIG. 5, and a description thereof is omitted. A stage having a stage circuit diagram of FIG. 9 to be described below may be applied to the scan driver 31 of FIG. 4 or the scan driver 31' of FIG. 8.

Figure 9:
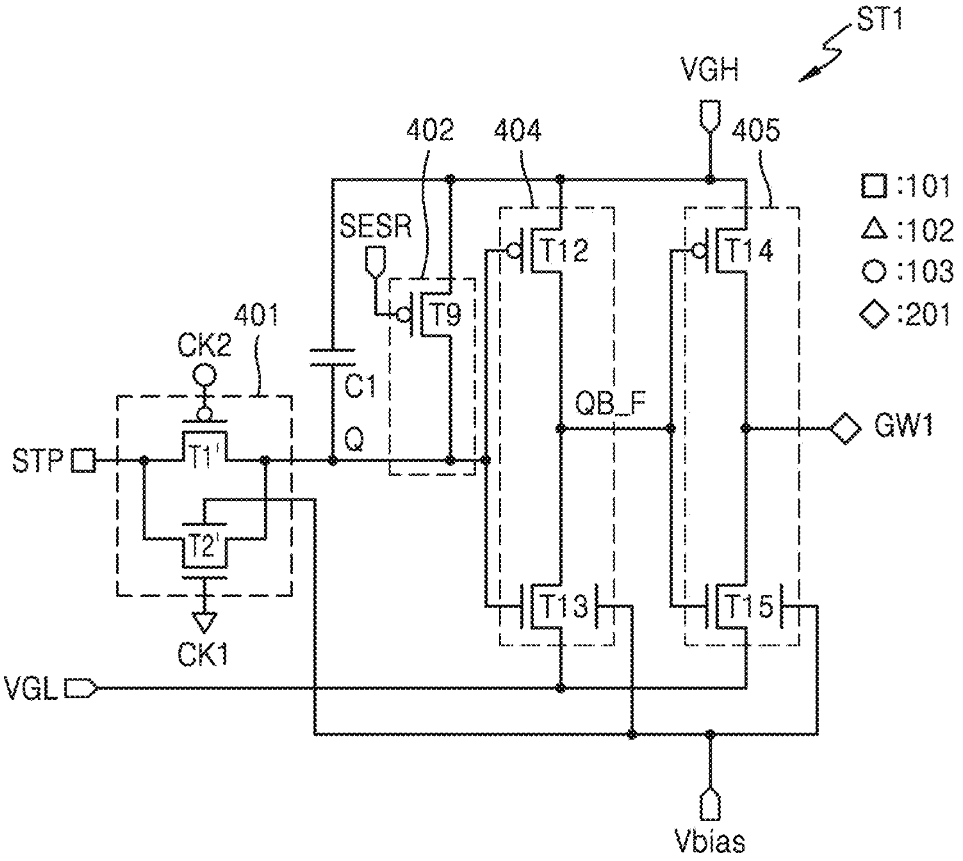
FIG. 9 is a schematic diagram of an equivalent circuit for explaining a stage of a scan driver included in a display device according to an embodiment.

FIG. 9 is a schematic diagram of an equivalent circuit for explaining a stage of a scan driver included in a display device according to an embodiment. The circuit diagram of the first stage ST1 in FIG. 9 may be different from the circuit diagram of the first stage ST1 shown in FIG. 5, at least in that the first node setting portion 401 is changed to include a first replacement transistor T1' which is a P-type transistor and a second replacement transistor T2' which is an N-type transistor, thereby simplifying the configuration of the first node setting portion 401, and the second node setting portion 403 is omitted. Configurations other than this may be the same as those described above with reference to FIG. 5, and specific details are omitted. The first replacement transistor T1' which is a P-type transistor, may have a first electrode receiving the scan start signal STP and a gate electrode receiving the second clock signal CK2. The second replacement transistor T2' which is an N-type transistor, may have a first electrode receiving the scan start signal STP, a gate electrode receiving the first clock signal CK1, and a second electrode connected to a second electrode of the first replacement transistor T1' and the second node Q.

Figure 10:
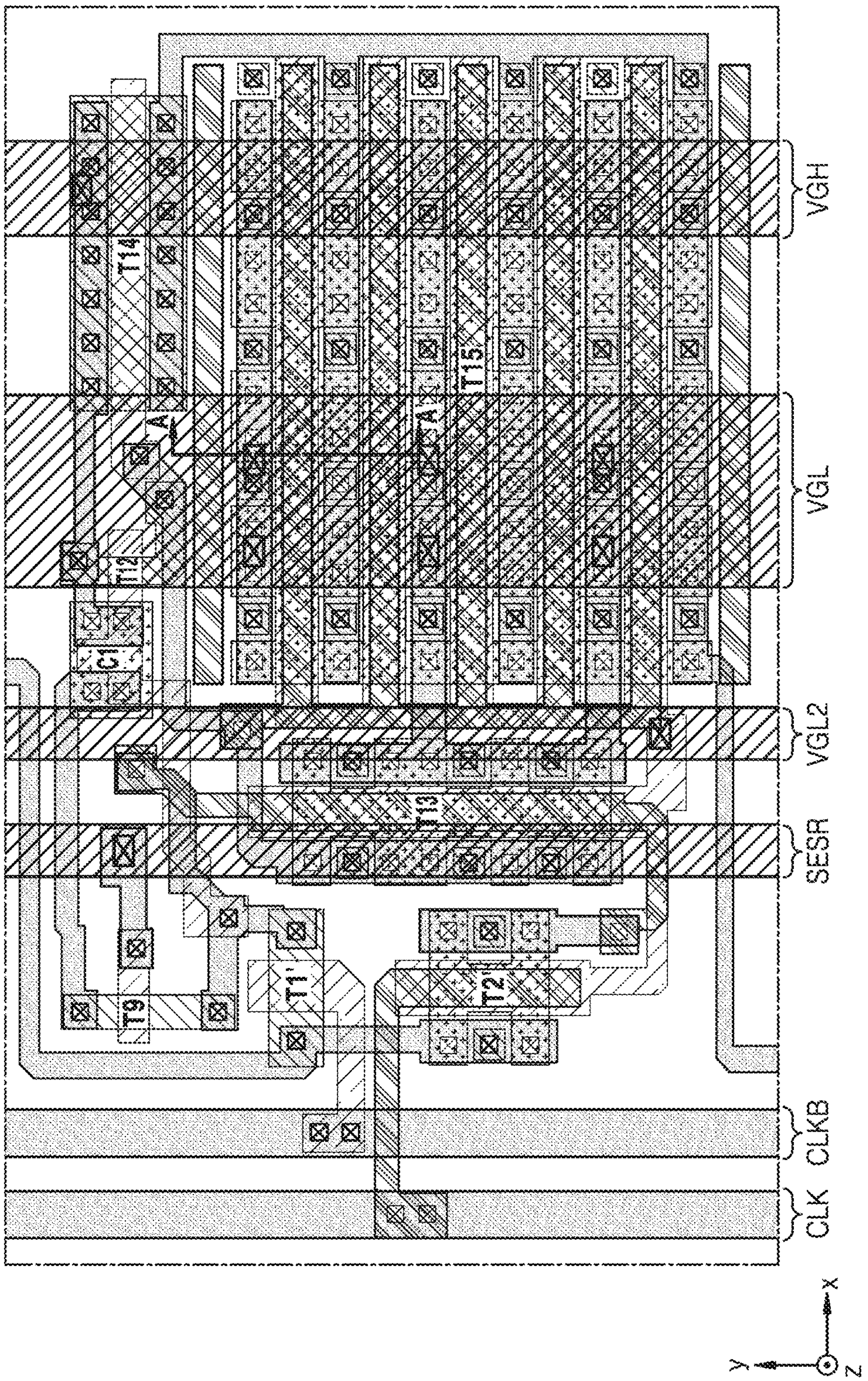
FIG. 10 is a layout diagram schematically showing positions of transistors and a capacitor, included in the stage of FIG. 9.
Figure 15:
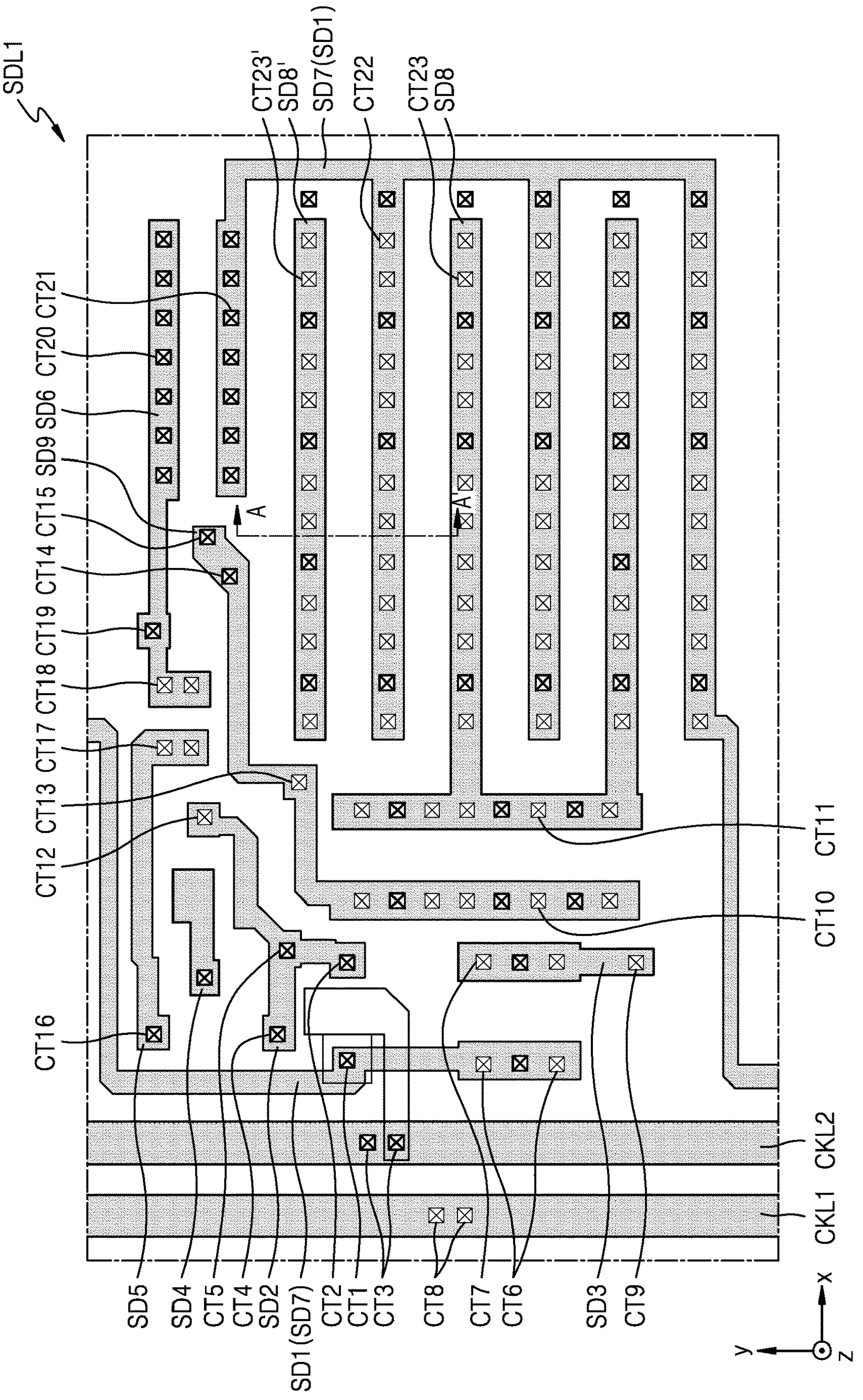
Figure 16:
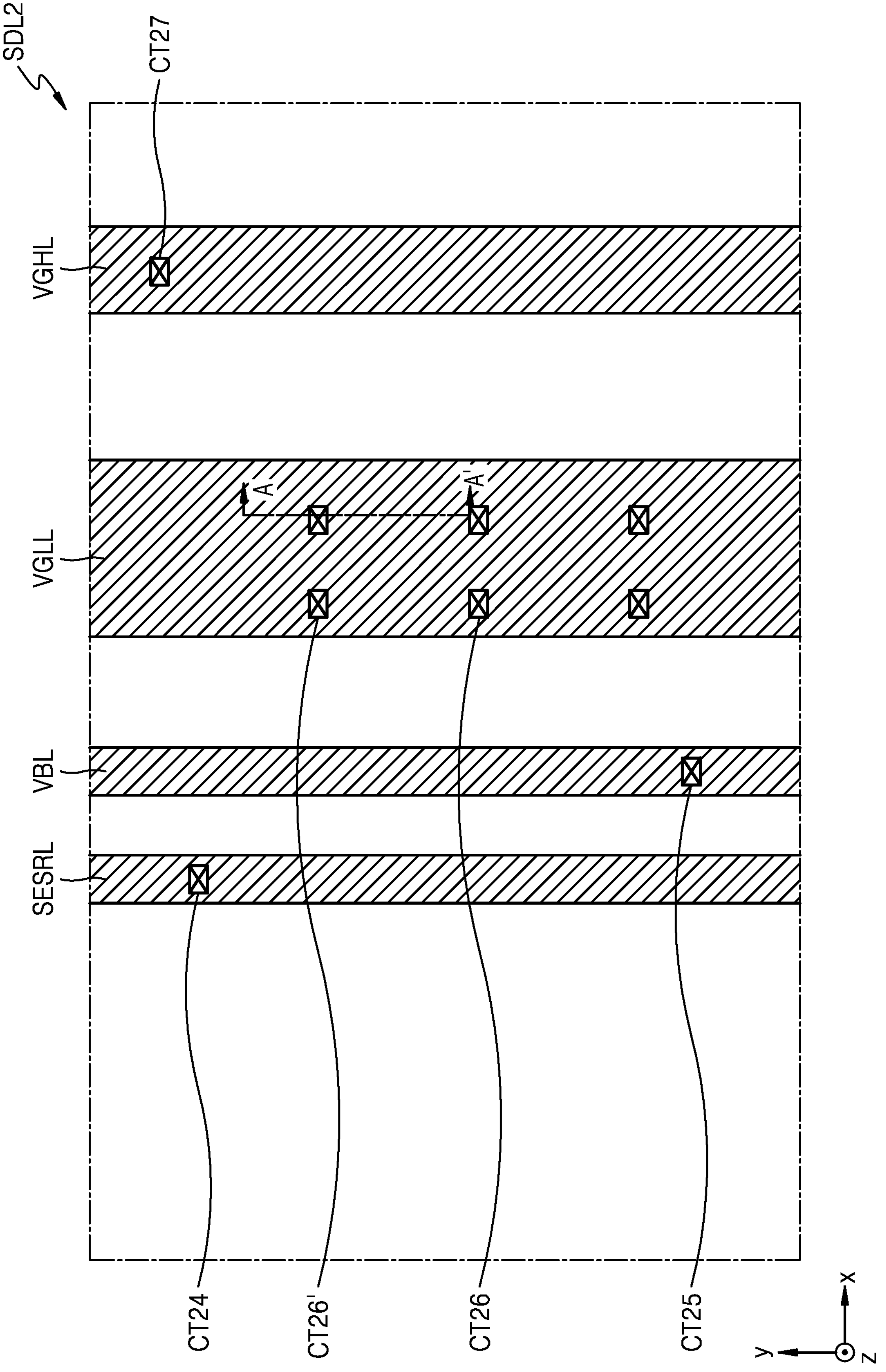
Figure 17:
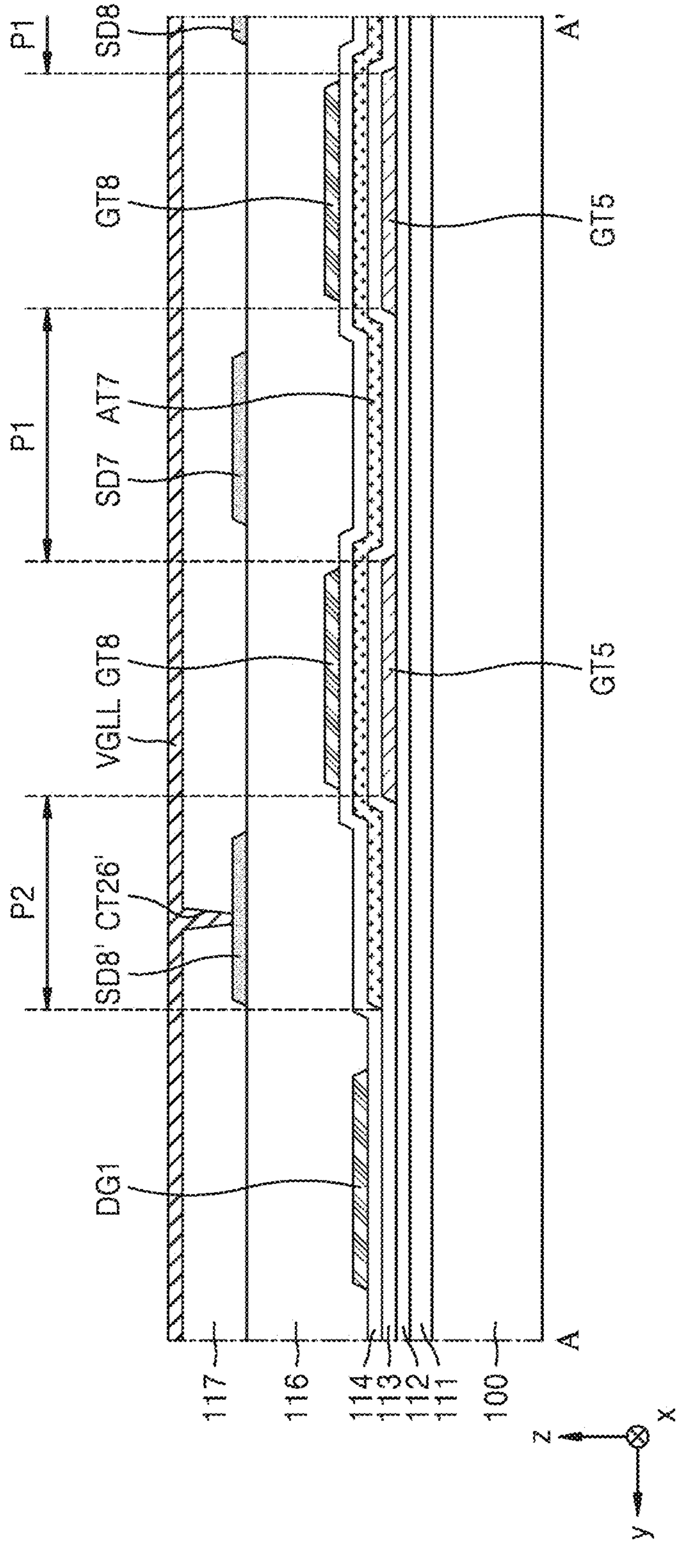
FIG. 17 is a schematic cross-sectional view schematically illustrating a cross-section taken along line A-A' in FIG. 10.

FIG. 10 is a layout diagram schematically illustrating positions of the transistors T1', T2', T9, T12, T13, T14, and T15 and the first capacitor C1, included in the stage of FIG. 9, FIGS. 11 to 16 are layout diagrams schematically illustrating layer by layer components, such as the transistors T1', T2', T9, T12, T13, T14, and T15 and the first capacitor C1, shown in FIG. 10, and FIG. 17 is a cross-sectional view schematically illustrating a cross-section taken along line A-A' in FIG. 10.

The display device 9 may include a substrate 100 (see FIG. 17), and various components, such as the transistors T1', T2', T9, T12, T13, T14, and T15, the first capacitor C1, lines that transmit clock signal CLK, CLKB, and lines that transmit voltages VGH, VGL, and VGL2 may be disposed on the substrate 100. The substrate 100 may include glass, metal or polymer resin. In case that the substrate 100 is flexible or bendable, the substrate 100 may include polymer resin, such as polyethersulfone, polyacrylate, polyetherimide, polyethylene naphthalate, polyethylene terephthalate, polyphenylene sulfide, polyarylate, polyimide, polycarbonate, or cellulose acetate propionate. The substrate 100 may have a multi-layered structure including two layers and a barrier layer therebetween, each of the two layers may include polymer resin, and the barrier layer may include an inorganic material, such as silicon oxide, silicon nitride, and silicon oxynitride, and various modifications may be made.

A first buffer layer 111 (see FIG. 17) including an inorganic insulating material, such as silicon oxide, silicon nitride, silicon oxynitride, or aluminum oxide, may be disposed on the substrate 100. The first buffer layer 111 may prevent diffusion of metal atoms or impurities from the substrate 100 to a first active layer ATL1 (see FIG. 11) positioned thereon.

Figure 11:
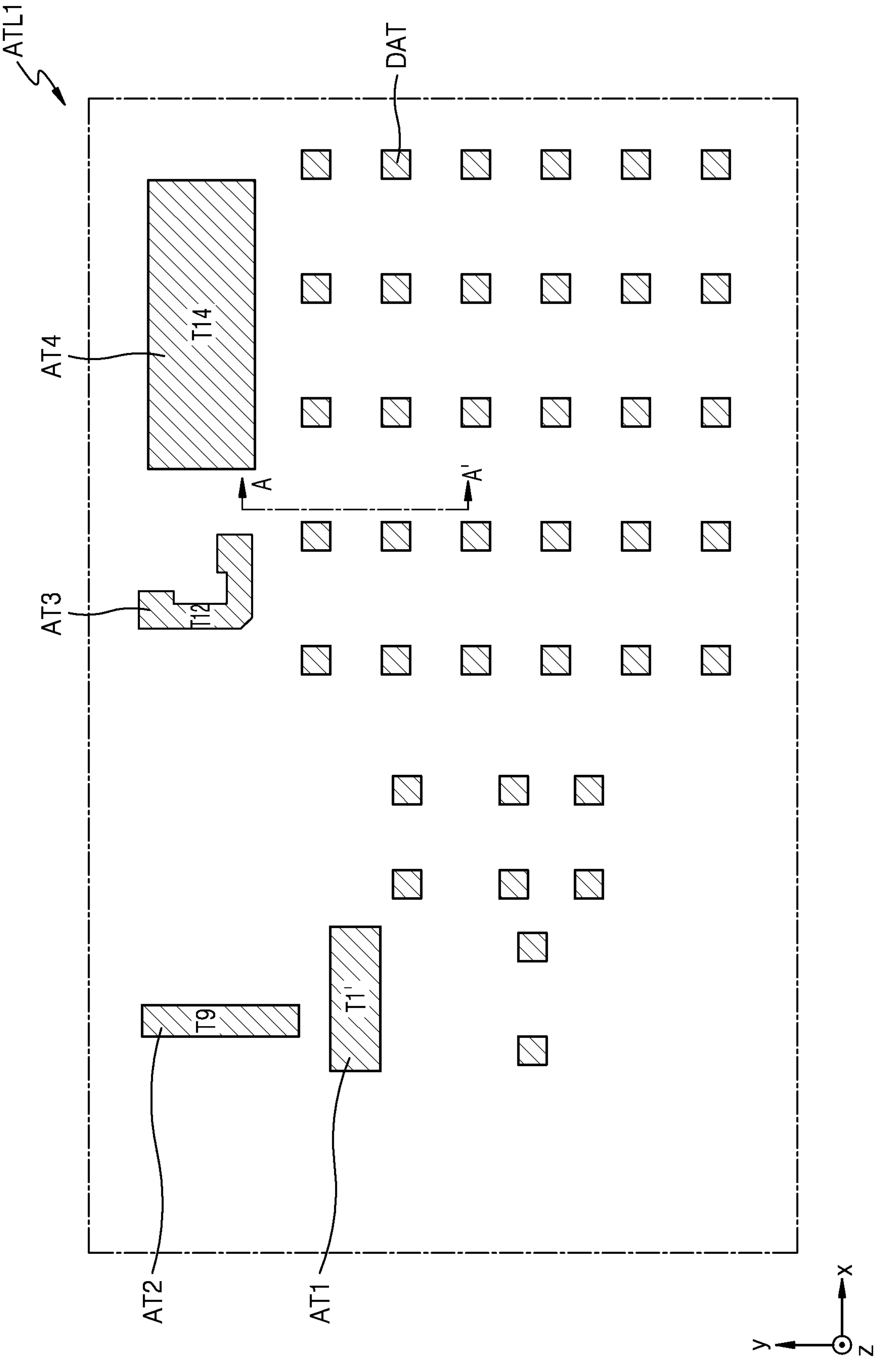
FIGS. 11 to 16 are layout diagrams schematically illustrating layer by layer components, such as the transistors and the capacitor shown in FIG. 10.

As shown in FIG. 11, the first active layer ATL1 may be disposed on the first buffer layer 111. The first active layer ATL1 may include a silicon semiconductor. For example, the first active layer ATL1 may include amorphous silicon or polysilicon. The first active layer ATL1 may include polysilicon crystallized at a low temperature. If necessary, ions may be implanted into at least a portion of the first active layer ATL1. An ion-implanted portion of the first active layer ATL1 may have conductivity. Accordingly, a portion of the first active layer ATL1 may be regarded as a first electrode or a second electrode of a transistor as needed. The same applies to a second active layer ATL2 to be described below.

The first active layer ATL1 may include a first sub-active layer AT1, a second sub-active layer AT2, a third sub-active layer AT3, a fourth sub-active layer AT4, and dummy active layers DAT. Each of the first sub-active layer AT1, the second sub-active layer AT2, the third sub-active layer AT3, and the fourth sub-active layer AT4 may have an isolated shape, and each of the dummy active layers DAT may also have an isolated shape. The first sub-active layer AT1, the second sub-active layer AT2, the third sub-active layer AT3, and the fourth sub-active layer AT4 may be electrically connected to each other by a first source drain layer SDL1, as described below with reference to FIG. 15.

The first sub-active layer AT1 may include a channel region of the first replacement transistor T1', and source and drain regions on sides of the channel region. The second sub-active layer AT2 may include a channel region of the ninth transistor T9, and source and drain regions on sides of the channel region. The third sub-active layer AT3 may include a channel region of the twelfth transistor T12, and source and drain regions on sides of the channel region. The fourth sub-active layer AT4 may include a channel region of the fourteenth transistor T14, and source and drain regions on sides of the channel region. The role of the dummy active layers DAT will be described below.

A first gate insulating layer 112 (see FIG. 17) may cover the first active layer ATL1 and may be disposed on the first buffer layer 111. The first gate insulating layer 112 may include an insulating material. For example, the first gate insulating layer 112 may include an inorganic insulating material, such as silicon oxide, silicon nitride, silicon oxynitride, or aluminum oxide.

Figure 12:
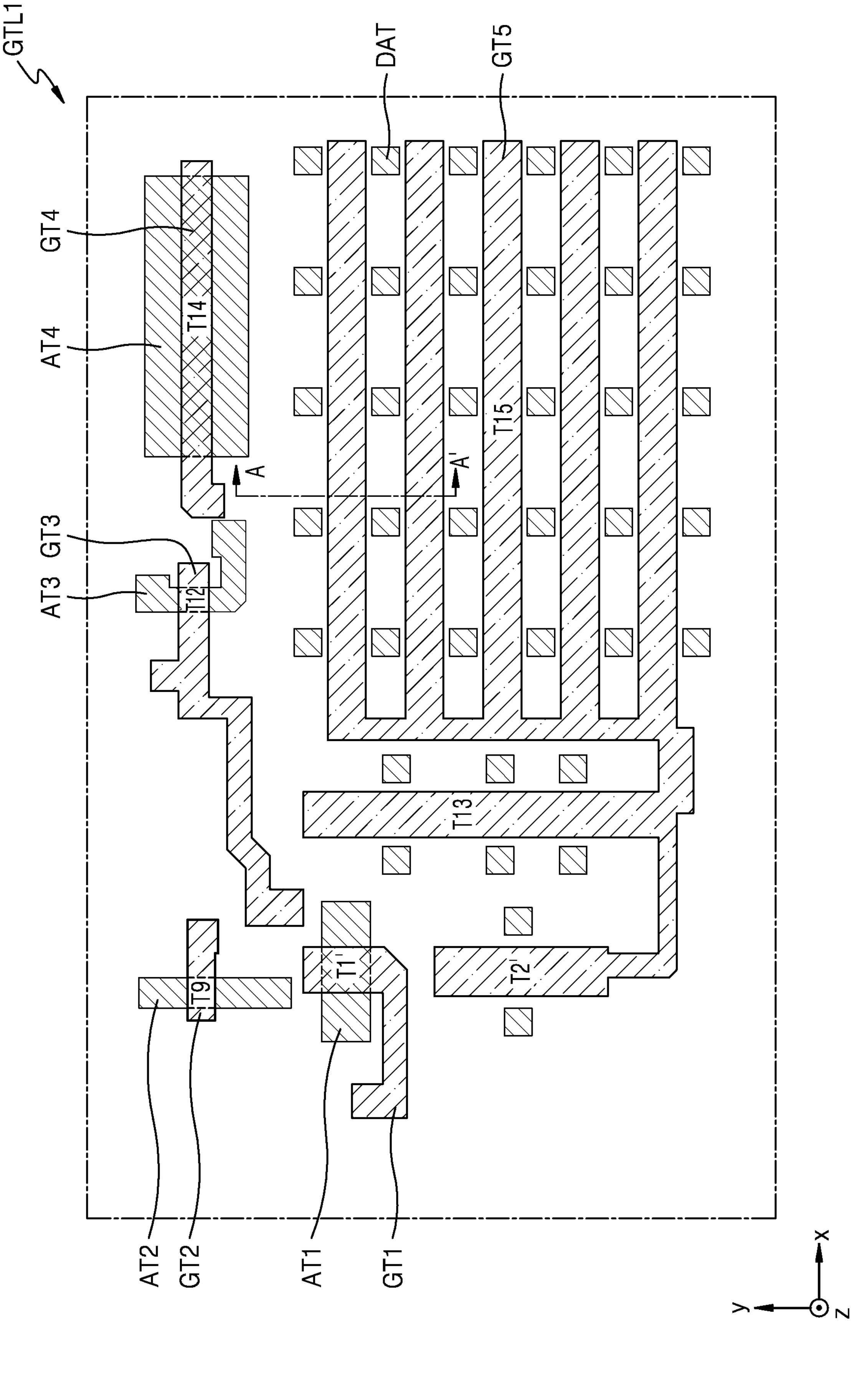

As shown in FIG. 12, a first gate layer GTL1 may be disposed on the first gate insulating layer 112. In an embodiment, the first gate layer GTL1 may include a first gate GT1, a second gate GT2, a third gate GT3, a fourth gate GT4, and a fifth gate GT5, which are spaced apart from each other. For reference, FIG. 12 illustrates the first gate layer GTL1 together with the first active layer ATL1 for convenience.

The first gate GT1 may overlap a portion of the first sub-active layer AT1 to serve as a gate electrode of the first replacement transistor T1'. The second gate GT2 may overlap a portion of the second sub-active layer AT2 to serve as a gate electrode of the ninth transistor T9. The third gate GT3 may overlap a portion of the third sub-active layer AT3 to serve as a gate electrode of the twelfth transistor T12. A portion of the third gate GT3 may serve as a second electrode of the first capacitor C1. For example, the gate electrode of the twelfth transistor T12 and the second electrode of the first capacitor C1 may be integral as a single body. The fourth gate GT4 may overlap a portion of the fourth sub-active layer AT4 to serve as a gate electrode of the fourteenth transistor T14.

The fifth gate GT5 that is formed as a single body may have a shape passing between the dummy active layers DAT. The fifth gate GT5 may be disposed below the gate electrode of the second replacement transistor T2', the gate electrode of the thirteenth transistor T13, and the gate electrode of the fifteenth transistor T15, which will be described below, and may serve as a back gate electrode of these transistors. As described above, the fifth gate GT5 serving as the back gate electrode may receive the bias voltage Vbias.

The first gate layer GTL1 may include, e.g., a metal, an alloy, a conductive metal oxide, a transparent conductive material, or a combination thereof. For example, the first gate layer GTL1 may include silver (Ag), an alloy containing Ag, molybdenum (Mo), an alloy containing Mo, aluminum (Al), an alloy containing Al, aluminum nitride (AlN), tungsten (W), tungsten nitride (WN), copper (Cu), nickel (Ni), chromium (Cr), chromium nitride (CrN), titanium (Ti), tantalum (Ta), platinum (Pt), scandium (Sc), indium tin oxide (ITO), indium zinc oxide (IZO), or the like, or a combination thereof. The first gate layer GTL1 may have a multi-layered structure. For example, the first gate layer GTL1 may have a two-layered structure including Mo/Al layers, a two-layered structure including Mo/Ti layers, or a three-layered structure including Mo/Al/Mo layers. Components included in the first gate layer GTL1 may be simultaneously formed of a same material and have a same layered-structure.

A second gate insulating layer 113 (see FIG. 17) may cover the first gate layer GTL1 and may be disposed on the first gate insulating layer 112. The second gate insulating layer 113 and the first gate insulating layer 112 may include an identical or similar insulating material.

Figure 13:
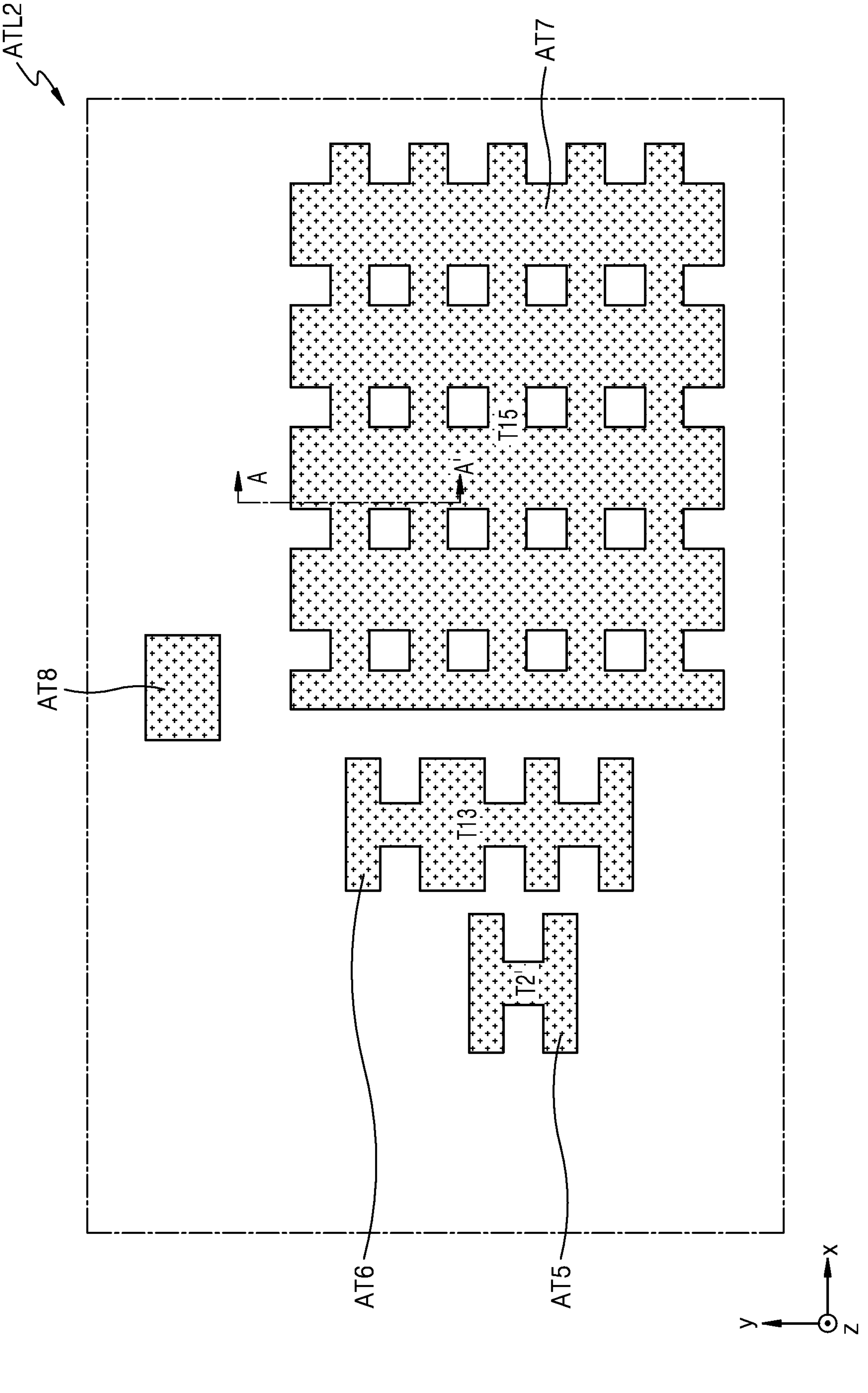

The second active layer ATL2 as shown in FIG. 13 may be disposed on the second gate insulating layer 113. The second active layer ATL2 may include, e.g., an oxide semiconductor. For example, the oxide semiconductor may be a Zn oxide-based material and may include Zn oxide, In—Zn oxide, or Ga—In—Zn oxide. As another example, the oxide semiconductor may include In—Ga—Zn—O (IGZO), In—Sn—Zn—O (ITZO), In—Ga—Sn—Zn—O (IGTZO), which contains metals, such as indium (In), gallium (Ga), and/or tin (Sn), in zinc oxide (ZnO), or a combination thereof. Ions may be implanted into at least a portion of the second active layer ATL2.

The second active layer ATL2 may include a fifth sub-active layer AT5, a sixth sub-active layer AT6, a seventh sub-active layer AT7, and an eighth sub-active layer AT8. Each of the fifth sub-active layer AT5, the sixth sub-active layer AT6, the seventh sub-active layer AT7, and the eighth sub-active layer AT8 may have an isolated shape. The fifth sub-active layer AT5, the sixth sub-active layer AT6, the seventh sub-active layer AT7, and the eighth sub-active layer AT8 may be electrically connected to each other by a first source drain layer SDL1, as described below with reference to FIG. 15.

The fifth sub-active layer AT5 may include a channel region of the second replacement transistor T2', and source and drain regions on sides of the channel region. The sixth sub-active layer AT6 may include a channel region of the thirteenth transistor T13, and source and drain regions on sides of the channel region. The seventh sub-active layer AT7 may include a channel region, a source region, and a drain region of the fifteenth transistor T15. The eighth sub-active layer AT8 may overlap a portion of the third gate GT3 and serve as a first electrode of the first capacitor C1.

The seventh sub-active layer AT7 may have through holes. Some of the dummy active layers DAT described above may correspond to the through holes of the seventh sub-active layer AT7. When viewed in a direction perpendicular to the substrate 100, each of some of the dummy active layers DAT described above may be disposed within a corresponding one of the through holes of the seventh sub-active layer AT7. The seventh sub-active layer AT7 may have concave portions on the outside, and each of the remaining dummy active layers DAT may be disposed within a corresponding one of the concave portions of the seventh sub-active layer AT7. Accordingly, even though the seventh sub-active layer AT7 has the through holes, the upper surface of a portion of an insulating layer covering the second active layer ATL2, the portion being disposed above the seventh sub-active layer AT7, may be substantially flat. For reference, the first semiconductor layer in the claims may be interpreted as the seventh sub-active layer AT7, and the second semiconductor layer in the claims may be interpreted as any one of the first to fourth sub-active layers AT1 to AT4.

A third gate insulating layer 114 (see FIG. 17) may cover the second active layer ATL2 and may be disposed on the second gate insulating layer 113. The third gate insulating layer 114 may include an insulating material. The third gate insulating layer 114 may include an inorganic insulating material, such as silicon oxide, silicon nitride, silicon oxynitride, or aluminum oxide.

Figure 14:
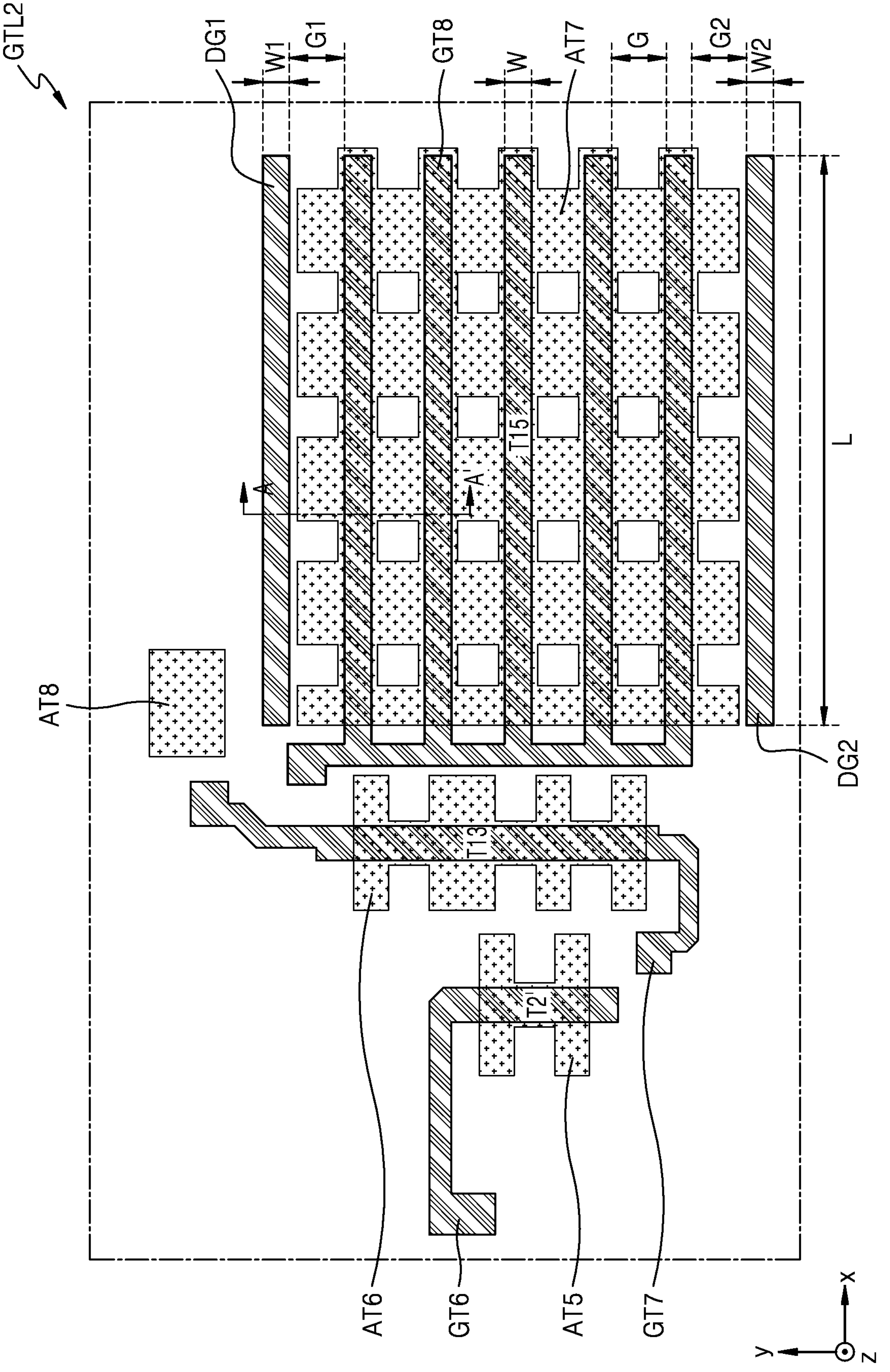

A second gate layer GTL2 as shown in FIG. 14 may be disposed on the third gate insulating layer 114. The second gate layer GTL2 may include a sixth gate GT6, a seventh gate GT7, an eighth gate GT8, a first dummy gate DG1, and a second dummy gate DG2, which are spaced apart from each other. For reference, FIG. 14 illustrates the second gate layer GTL2 together with the second active layer ATL2 for convenience. The first dummy gate DG1 and the second dummy gate DG2 may also be referred to as a first dummy gate electrode and a second dummy gate electrode, respectively.

The sixth gate GT6 may overlap a portion of the fifth sub-active layer AT5 and serve as a gate electrode of the second replacement transistor T2'. The seventh gate GT7 may overlap a portion of the sixth sub-active layer AT6 and serve as a gate electrode of the thirteenth transistor T13. The eighth gate GT8 may overlap a portion of the seventh sub-active layer AT7 and serve as a gate electrode of the fifteenth transistor T15. As described above, the seventh sub-active layer AT7 has through holes, and the eighth gate GT8 may have prongs extending in a first direction (x-axis direction) to correspond to areas between the through holes. For example, the seventh sub active layer AT7 may have through holes so as to be positioned between the prongs. The prongs may be electrically connected to each other by a connection electrode extending in a second direction (y-axis direction) crossing the first direction (x-axis direction). The prongs and the connection electrode may be integral as a single body, as shown in FIG. 14. In the second direction (y-axis direction), assuming that the prongs are in the center, the first dummy gate DG1 may be disposed on a side (+y direction) of the prongs, and the second dummy gate DG2 may be disposed on another side (−y direction) of the prongs. Furthermore, when viewed in a direction (z-axis direction) perpendicular to the substrate 100, the first dummy gate DG1 and the second dummy gate DG2 may be disposed outside the seventh sub-active layer AT7.

The second gate layer GTL2 may include a metal, an alloy, a conductive metal oxide, or a transparent conductive material. For example, the second gate layer GTL2 may include Ag, an alloy containing Ag, Mo, an alloy containing Mo, Al, an alloy containing Al, AlN, W, WN, Cu, Ni, Cr, CrN, Ti, Ta, Pt, Sc, ITO, IZO, or the like. The second gate layer GTL2 may have a multi-layered structure. For example, the second gate layer GTL2 may have a two-layered structure including Mo/Al layers, a two-layered structure including Mo/Ti layers, or a three-layered structure including Mo/Al/Mo layers. Components included in the second gate layer GTL2 may be simultaneously formed of a same material and have a same layered-structure.

As described above, FIG. 14 illustrates the second gate layer GTL2 together with the second active layer ATL2 for convenience. Impurities may be added to a portion of the second active layer ATL2 that does not overlap the second gate layer GTL2. For example, the portion of the second active layer ATL2 that does not overlap the second gate layer GTL2 may be a doped portion. Accordingly, the electrical characteristics of the portion of the second active layer ATL2 that does not overlap the second gate layer GTL2 may be different from the electrical characteristics of a portion of the second active layer ATL2 that overlaps the second gate layer GTL2.

A first interlayer insulating layer 116 (see FIG. 17) may cover the second gate layer GTL2 and may be disposed on the third gate insulating layer 114. The first interlayer insulating layer 116 may include an inorganic insulating material, such as silicon oxide, silicon nitride, silicon oxynitride, or aluminum oxide. The first interlayer insulating layer 116 may also include an inorganic insulating material similarly to the third gate insulating layer 114, etc., but the first interlayer insulating layer 116 may be formed to be thicker than the third gate insulating layer 114, and the first interlayer insulating layer 116 may be less affected by components positioned under the first interlayer insulating layer 116. Therefore, the upper surface of the first interlayer insulating layer 116 may have a relatively less curvature compared to the upper surface of the third gate insulating layer 114 or the like. FIG. 17 illustrates that the upper surface of the first interlayer insulating layer 116 is flat, but this is only for convenience, and the upper surface of the first interlayer insulating layer 116 may also be non-flat.

The first source drain layer SDL1 as shown in FIG. 15 may be disposed on the first interlayer insulating layer 116. The first source drain layer SDL1 may include a first source drain SD1, a second source drain SD2, a third source drain SD3, a fourth source drain SD4, a fifth source drain SD5, a sixth source drain SD6, a seventh source drain SD7, an eighth source drain SD8, a ninth source drain SD9, a first clock line CKL1, and a second clock line CKL2.

The first source drain SD1 may be electrically connected to the first sub-active layer AT1 through a first contact hole CT1 and be electrically connected to the fifth sub-active layer AT5 through a sixth contact hole CT6. For example, the first source drain SD1 may be the second electrode of the first replacement transistor T1' and the second electrode of the second replacement transistor T2'.

The second clock line CKL2 may be electrically connected to the first gate GT1 through a third contact hole CT3 and apply a second clock signal to the first gate GT1, which is the gate electrode of the first replacement transistor T1'.

The second source drain SD2 may be electrically connected to the first sub-active layer AT1 through a second contact hole CT2 and be electrically connected to the second sub-active layer AT2 through a fourth contact hole CT4. For example, the second source drain SD2 may be the first electrode of the first replacement transistor T1' and the second electrode of the ninth transistor T9. The second source drain SD2 may be electrically connected to the third gate GT3, which is the gate electrode of the twelfth transistor T12 and the second electrode of the first capacitor C1, through a fifth contact hole CT5, and thus, the second node Q may be formed. The second source drain SD2 may also be electrically connected to the seventh gate GT7, which is the gate electrode of the thirteenth transistor T13, through a twelfth contact hole CT12.

The third source drain SD3 may be electrically connected to the fifth sub-active layer AT5 through a seventh contact hole CT7, and be electrically connected to the seventh gate GT7 through a ninth contact hole CT9. The fourth source drain SD4 may be electrically connected to the second gate GT2, which is the gate electrode of the ninth transistor T9, through a contact hole to thereby electrically connect an initialization signal line SESRL (see FIG. 16) to the second gate GT2, as described below.

The fifth source drain SD5 may be electrically connected to the second sub-active layer AT2 through a sixteenth contact hole CT16 and may be electrically connected to the eighth sub-active layer AT8, which is the first electrode of the first capacitor C1, through a seventeenth contact hole CT17. For example, the fifth source drain SD5 may be electrically connected to the first electrode of the first capacitor C1 as the first electrode of the ninth transistor T9.

The sixth source drain SD6 may be electrically connected to the eighth sub-active layer AT8, which is the first electrode of the first capacitor C1, through an eighteenth contact hole CT18, be electrically connected to the third sub-active layer AT3 through a nineteenth contact hole CT19, and be electrically connected to the fourth sub-active layer AT4 through a twentieth contact hole CT20. For example, the sixth source drain SD6 may be the first electrode of the twelfth transistor T12 and the first electrode of the fourteenth transistor T14.

The seventh source drain SD7 may be electrically connected to the fourth sub-active layer AT4 through a twenty-first contact hole CT21 and be electrically connected to the seventh sub-active layer AT7 through a twenty-second contact hole CT22. For example, the seventh source drain SD7 may be the second electrode of the fourteenth transistor T14 and the first electrode of the fifteenth transistor T15. The seventh source drain SD7 may be an output terminal 201 (see FIG. 4), and as shown in FIG. 4, the output terminal 201 may be electrically connected to the first input terminal 101 of a next stage, and thus, the seventh source drain SD7 may be the first source drain SD1 of the next stage. Similarly, the first source drain SD1 shown in FIG. 15 may be the seventh source drain SD7 of a previous stage.

As described above, the eighth gate GT8, which is the gate electrode of the fifteenth transistor T15, may have prongs extending in the first direction (x-axis direction) to correspond to the areas between the through holes of the seventh sub-active layer AT7. Therefore, as shown in FIG. 15, the seventh source drain SD7 may have first prongs that are positioned between the prongs of the eighth gate GT8 when viewed in a direction (z-axis direction) perpendicular to the substrate 100 and are electrically connected to each other. These first prongs may be integral as a single body, as shown in FIG. 15.

When viewed in the direction (z-axis direction) perpendicular to the substrate 100, one of the first prongs of the seventh source drain SD7 may be disposed between the eighth gate GT8 and one of the first dummy gate DG1 and the second dummy gate DG2. FIG. 14 illustrates that one (disposed at the outermost part in the −y direction) of the first prongs of the seventh source drain SD7 is disposed between the second dummy gate DG2 and the eighth gate GT8.

The eighth source drain SD8 may be electrically connected to the sixth sub-active layer AT6 through an eleventh contact hole CT11 and be electrically connected to the seventh sub-active layer AT7 through a twenty-third contact hole CT23. For example, the eighth source drain SD8 may be the second electrode of the thirteenth transistor T13 and the second electrode of the fifteenth transistor T15.

As described above, the eighth gate GT8, which is the gate electrode of the fifteenth transistor T15, may have prongs extending in the first direction (x-axis direction) to correspond to the areas between the through holes of the seventh sub-active layer AT7. Therefore, as shown in FIG. 15, the eighth source drain SD8 may have second prongs that are positioned between the prongs of the eighth gate GT8 when viewed in a direction (z-axis direction) perpendicular to the substrate 100 and are electrically connected to each other. These second prongs may be integral as a single body, as shown in FIG. 15. The second prongs may be spaced apart from the first prongs.

For reference, FIG. 15 illustrates that an additional eighth source drain SD8' is disposed apart from the eighth source drain SD8, and electrically connected to the seventh sub-active layer AT7 through an additional twenty-third contact hole CT23'. The additional eighth source drain SD8' may be electrically connected to the eighth source drain SD8 through a low voltage line VGLL (see FIG. 16), and the additional eighth source drain SD8' and the eighth source drain SD8 may have a same function. In case that the layout is changed, the additional eighth source drain SD8' and the eighth source drain SD8 may be integral as a single body, and the additional eighth source drain SD8' may be one of the second prongs of the eighth source drain SD8.

When viewed in a direction (z-axis direction) perpendicular to the substrate 100, one of the second prongs of the eighth source drain SD8 may be disposed between the eighth gate GT8 and one of the first dummy gate DG1 and the second dummy gate DG2. FIGS. 14 and 15 illustrate that the additional eighth source drain SD8', which may be referred to as second prongs of the eighth source drain SD8, is disposed between the first dummy gate DG1 and the eighth gate GT8.

The ninth source drain SD9 may be electrically connected to the sixth sub-active layer AT6 through a tenth contact hole CT10, be electrically connected to the eighth gate GT8, which is the gate electrode of the fifteenth transistor T15, through a thirteenth contact hole CT13, be electrically connected to the third sub-active layer AT3 through a fourteenth contact hole CT14, and be electrically connected to the fourth gate GT4, which is the gate electrode of the fourteenth transistor T14, through a fifteenth contact hole CT15. For example, the ninth source drain SD9 may be the second electrode of the twelfth transistor T12 and the first electrode of the thirteenth transistor T13.

The first clock line CKL1 may be electrically connected to the sixth gate GT6, which is the gate electrode of the second replacement transistor T2', through an eighth contact hole CT8 and may apply the first clock signal CK1 to the sixth gate GT6.

The first source drain layer SDL1 may include, e.g., a metal, an alloy, a conductive metal oxide, or a transparent conductive material. For example, the first source drain layer SDL1 may include Ag, an alloy containing Ag, Mo, an alloy containing Mo, Al, an alloy containing Al, AlN, W, WN, Cu, Ni, Cr, CrN, Ti, Ta, Pt, Sc, ITO, IZO, the like, or a combination thereof. The first source drain layer SDL1 may have a multi-layered structure. For example, the first source drain layer SDL1 may have a two-layered structure including Ti/Al layers or a three-layered structure including Ti/Al/Ti layers. Components included in the first source drain SD1 may be simultaneously formed of a same material and have a same layered-structure.

A second interlayer insulating layer 117 (see FIG. 17) may cover the first source drain layer SDL1 and may be disposed on the first interlayer insulating layer 116. The second interlayer insulating layer 117 may include an inorganic insulating material, such as silicon oxide, silicon nitride, silicon oxynitride, or aluminum oxide. As another example, the second interlayer insulating layer 117 may include photoresist, benzocyclobutene (BCB), polyimide, hexamethyldisiloxane (HMDSO), polymethylmethacrylate (PMMA), polystyrene, a polymer derivative having a phenol-based group, an acryl-based polymer, an imide-based polymer, an acryl ether-based polymer, an amide-based polymer, a fluorine-based polymer, a p-xylene-based polymer, a vinyl alcohol-based polymer, a blend thereof, or the like.

A second source drain layer SDL2 as shown in FIG. 16 may be disposed on the second interlayer insulating layer 117. The second source drain layer SDL2 may include an initialization signal line SESRL, a bias voltage line VBL, a low voltage line VGLL, and a high voltage line VGHL.

The initialization signal line SESRL may be electrically connected to the fourth source drain SD4 through a twenty-fourth contact hole CT24, and as a result, the initialization signal line SESRL may be electrically connected to the second gate GT2, which is the gate electrode of the ninth transistor T9. Accordingly, the initialization signal line SESRL may apply an initialization signal to the gate electrode of the ninth transistor T9.

The bias voltage line VBL may be electrically connected to the fifth gate GT5 through a twenty-fifth contact hole CT25 and supply a bias voltage Vbias to back gate electrodes of the second replacement transistor T2', the thirteenth transistor T13, and the fifteenth transistor T15.

The low voltage line VGLL may be electrically connected to the eighth source drain SD8 through a twenty-sixth contact hole CT26 and apply the voltage of the low level VGL to the second electrode of the fifteenth transistor T15 and the second electrode of the thirteenth transistor T13. Also, as described above, the low voltage line VGLL may be electrically connected to the additional eighth source drain SD8' through an additional twenty-sixth contact hole CT26', and thus, the additional eighth source drain SD8' and the eighth source drain SD8 may be electrically connected to each other.

The high voltage line VGHL may be electrically connected to the sixth source drain SD6 through a twenty-seventh contact hole CT27 and apply the voltage of the high level VGH to the first electrode of the fourteenth transistor T14, the first electrode of the twelfth transistor T12, the first electrode of the ninth transistor T9, and the second electrode of the first capacitor C1.

The second source drain layer SDL2 may include a metal, an alloy, a conductive metal oxide, or a transparent conductive material. For example, the second source drain layer SDL2 may include Ag, an alloy containing Ag, Mo, an alloy containing Mo, Al, an alloy containing Al, AlN, W, WN, Cu, Ni, Cr, CrN, Ti, Ta, Pt, Sc, ITO, IZO, or the like. The second source drain layer SDL2 may have a multi-layered structure. For example, the second source drain layer SDL2 may have a two-layered structure including Ti/Al layers or a three-layered structure including Ti/Al/Ti layers. Components included in the second source drain SD2 may be simultaneously formed of a same material and have a same layered-structure.

As described above, the eighth gate GT8 may have prongs, and thus, an area thereof overlapping the seventh sub-active layer AT7 may be widened. This is because stabilization of characteristics of the fifteenth transistor T15 is important as the first electrode of the fifteenth transistor T15 having the eighth gate GT8 as a gate electrode serves as the output terminal 201. Accordingly, it may be preferable to maintain a constant surrounding environment for each of the prongs of the eighth gate GT8. As described above, the display device according to the embodiment may include the first dummy gate DG1 and the second dummy gate DG2, through which the surrounding environment for each of the prongs of the eighth gate GT8 may be kept constant.

As described above, the first interlayer insulating layer 116 may include silicon oxide, silicon nitride, silicon oxynitride, or aluminum oxide. The first interlayer insulating layer 116 may contain hydrogen or hydrogen ions therein. The second active layer ATL2 including an oxide semiconductor, such as IGZO, may be affected by hydrogen or hydrogen ions included in the first interlayer insulating layer 116, and thus, characteristics of a transistor including an oxide semiconductor may be changed.

The second gate layer GTL2 may serve to trap hydrogen or hydrogen ions included in the first interlayer insulating layer 116 covering the second gate layer GTL2. For example, in case that the second gate layer GTL2 has a two-layered structure including Mo/Ti layers, since titanium has a property of bonding with hydrogen or hydrogen ions, titanium may trap neighboring hydrogen or hydrogen ions. Therefore, in the case of first portions P1 positioned between the prongs of the eighth gate GT8 from among portions of the seventh sub-active layer AT7 shown in FIG. 17, since hydrogen or hydrogen ions included in the first interlayer insulating layer 116 are trapped in the prongs of the eighth gate GT8, the characteristics of the first portions P1 may not change, or the degree of change of the characteristics may be suppressed to a minimum.

In case that the first dummy gate DG1 is not present, a second portion P2 of the seventh sub-active layer AT7 shown in FIG. 17, which is positioned outside the outermost prong in a second direction (y-axis direction) from among the prongs of the eighth gate GT8, may be greatly affected by hydrogen or hydrogen ions included in the first interlayer insulating layer 116, unlike the first portions P1 of the seventh sub-active layer AT7 positioned between the prongs of the eighth gate GT8. This is because hydrogen or hydrogen ions included in the first interlayer insulating layer 116 may move along the first interlayer insulating layer 116 and affect the second portion P2. This is the same even in case that the second dummy gate DG2 is not present. Accordingly, in case that the first dummy gate DG1 and the second dummy gate DG2 are not present, the characteristics of the fifteenth transistor T15 may deteriorate.

However, in the case of the display device according to the embodiment, the first dummy gate DG1 and the second dummy gate DG2 may be present outside the prongs of the eighth gate GT8, and hydrogen or hydrogen ions included in the first interlayer insulating layer 116 may be trapped by not only the prongs of the eighth gate GT8 but also the first dummy gate DG1 and the second dummy gate DG2. Therefore, the characteristics of the fifteenth transistor T15 may be prevented from deteriorating by keeping the characteristics of the second portion P2 of the seventh sub-active layer AT7 the same as or similar to the characteristics of the first portion P1.

As described above, a portion of the second active layer ATL2 may be doped. An impurity may be added to a portion of the second active layer ATL2, which does not overlap the second gate layer GTL2, by using the second gate layer GTL2 as a mask. In case that the first dummy gate DG1 is not present, in the second portion P2 of the seventh sub-active layer AT7 shown in FIG. 17, which is positioned outside the outermost prong in a second direction (y-axis direction) from among the prongs of the eighth gate GT8, the concentration of doped impurities may be excessively high, unlike in the first portions P1 of the seventh sub-active layer AT7 positioned between the prongs of the eighth gate GT8. This is because the doped impurities may move along the first interlayer insulating layer 116 and penetrate into the second portion P2. This is the same even in case that the second dummy gate DG2 is not present. Accordingly, in case that the first dummy gate DG1 and the second dummy gate DG2 are not present, the characteristics of the fifteenth transistor T15 may deteriorate.

However, in the case of the display device according to the embodiment, the first dummy gate DG1 and the second dummy gate DG2 are present outside the prongs of the eighth gate GT8, doped impurities may be trapped by the prongs of the eighth gate GT8 as well as the first dummy gate DG1 and the second dummy gate DG2. Therefore, the characteristics of the fifteenth transistor T15 may be prevented from deteriorating by keeping the characteristics of the second portion P2 of the seventh sub-active layer AT7 the same as or similar to the characteristics of the first portion P1.

For example, a portion of the second active layer ATL2 that does not overlap the second gate layer GTL2 may be a doped portion. Accordingly, the electrical characteristics of the portion of the second active layer ATL2 that does not overlap the second gate layer GTL2 may be different from the electrical characteristics of a portion of the second active layer ATL2 that overlaps the second gate layer GTL2.

The prongs of the eighth gate GT8, which is the gate electrode of the fifteenth transistor T15, may overlap the seventh sub-active layer AT7, as described above. When viewed in the direction (z-axis direction) perpendicular to the substrate 100, lengths L of portions of the prongs which overlap the seventh sub-active layer AT7, in the first direction (x-axis direction) may be equal to each other. The length of each of the first dummy gate DG1 and the second dummy gate DG2 in the first direction (x-axis direction) may be equal to the length of a portion of each of the prongs, which overlaps the seventh sub-active layer AT7, in the first direction, and thus, the characteristics of the fifteenth transistor T15 may be constant.

As shown in FIG. 14, an interval G between the prongs of the eighth gate GT8 may be constant. An interval G1 between the first dummy gate DG1 and a prong closest to the first dummy gate DG1 among the prongs may be equal to the interval G between the prongs. Similarly, an interval G2 between the second dummy gate DG2 and a prong closest to the second dummy gate DG2 among the prongs may be equal to the interval G between the prongs. Through this, the characteristics of the fifteenth transistor T15 may be constant.

As shown in FIG. 14, widths W of the prongs of the eighth gate GT8 in the second direction (y-axis direction) may be constant. A width W1 of the first dummy gate DG1 in the second direction (y-axis direction) may be equal to the width W of the prongs. Similarly, a width W2 of the second dummy gate DG2 in the second direction (y-axis direction) may be equal to the width W of the prongs. Through this, the characteristics of the fifteenth transistor T15 may be constant.

According to one or more embodiments of the disclosure as described above, a display device capable of displaying high-quality images may be implemented. However, the scope of the disclosure is not limited by these effects.

The above description is an example of technical features of the disclosure, and those skilled in the art to which the disclosure pertains will be able to make various modifications and variations. Thus, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A display device comprising:
- a display area and a peripheral area;
- a transistor and a display element electrically connected to the transistor, the transistor and the display element being disposed in the display area;
- scan lines; and
- a scan driver disposed only in the peripheral area and providing scan signals to the scan lines,
- wherein the scan driver includes:
  - a gate electrode having a plurality of prongs extending in a first direction and electrically connected to each other; and
  - in a second direction intersecting the first direction, a first dummy gate electrode disposed on one side of the plurality of prongs and a second dummy gate electrode disposed on another side of the plurality of prongs.

2. The display device of claim 1, wherein the plurality of prongs are integrally formed as a single body.

3. The display device of claim 1, further comprising:
- a first semiconductor layer overlapping the gate electrode,
- wherein lengths of portions of the plurality of prongs in the first direction are substantially equal to each other, the portions of the plurality of prongs overlapping the first semiconductor layer.

4. The display device of claim 3, wherein a length of each of the first dummy gate electrode and the second dummy gate electrode in the first direction is substantially equal to a length of a portion of each of the plurality of prongs in the first direction, the portion of each of the plurality of prongs overlapping the first semiconductor layer.

5. The display device of claim 3, wherein in a plan view, the first dummy gate electrode and the second dummy gate electrode are disposed outside the first semiconductor layer.

6. The display device of claim 3, wherein the first semiconductor layer includes an oxide semiconductor.

7. The display device of claim 1, further comprising:
- a first semiconductor layer overlapping the gate electrode and having a plurality of through holes disposed between the plurality of prongs in a plan view; and
- a plurality of dummy semiconductor layers disposed within the plurality of through holes of the first semiconductor layer in a plan view.

8. The display device of claim 7, wherein
- the first semiconductor layer includes an oxide semiconductor, and
- the plurality of dummy semiconductor layers include polysilicon.

9. The display device of claim 7, further comprising:
- a second semiconductor layer, the second semiconductor layer and the first semiconductor layer being disposed on different layers and including different materials,
- wherein the plurality of dummy semiconductor layers and the second semiconductor layer include a same material.

10. The display device of claim 1, wherein the gate electrode, the first dummy gate electrode, and the second dummy gate electrode are disposed on a same layer.

11. The display device of claim 1, wherein an interval between the plurality of prongs is constant.

12. A display device comprising:
- a display area and a peripheral area;
- a transistor and a display element electrically connected to the transistor, the transistor and the display element being disposed in the display area; and
- a scan driver disposed in the peripheral area,
- wherein the scan driver includes:
  - a gate electrode having a plurality of prongs extending in a first direction and electrically connected to each other; and
  - in a second direction intersecting the first direction, a first dummy gate electrode disposed on one side of the plurality of prongs and a second dummy gate electrode disposed on another side of the plurality of prongs,
- wherein an interval between the first dummy gate electrode and a prong closest to the first dummy gate electrode from among the plurality of prongs is substantially equal to an interval between the plurality of prongs.

13. The display device of claim 12, wherein an interval between the second dummy gate electrode and a prong closest to the second dummy gate electrode from among the plurality of prongs is substantially equal to the interval between the plurality of prongs.

14. The display device of claim 1, wherein widths of the plurality of prongs in the second direction are substantially equal to each other.

15. A display device comprising:

a display area and a peripheral area;

a transistor and a display element electrically connected to the transistor, the transistor and the display element being disposed in the display area; and a scan driver disposed in the peripheral area, wherein the scan driver includes:

a gate electrode having a plurality of prongs extending in a first direction and electrically connected to each other; and in a second direction intersecting the first direction, a first dummy gate electrode disposed on one side of the plurality of prongs and a second dummy gate electrode disposed on another side of the plurality of prongs, wherein a width of each of the first dummy gate electrode and the second dummy gate electrode in the second direction is substantially equal to a width of each of the plurality of prongs in the second direction.

16. The display device of claim 1, wherein the scan driver includes a plurality of stages, each of the plurality of stages including:

an output terminal electrically connected to a corresponding scan line of the scan lines; and a transistor electrically connected to the output terminal, and having the gate electrode, the first dummy gate electrode, and the second dummy gate electrode.

17. The display device of claim 1, further comprising:

first prongs disposed between the plurality of prongs in a plan view and electrically connected to each other; and second prongs disposed between the plurality of prongs in a plan view and electrically connected to each other, the second prongs being apart from the first prongs.

18. The display device of claim 17, wherein in a plan view, one of the first prongs is disposed between the gate electrode and one of the first dummy gate electrode and the second dummy gate electrode, and one of the second prongs is disposed between the gate electrode and another one of the first dummy gate electrode and the second dummy gate electrode.

19. The display device of claim 1, wherein the gate electrode, the first dummy gate electrode, and the second dummy gate electrode have a same layered-structure.

20. The display device of claim 1, wherein each of the gate electrode, the first dummy gate electrode, and the second dummy gate electrode includes a titanium layer.

* * * * *